United States Patent [19]
Hartman et al.

[11] Patent Number: 5,103,789
[45] Date of Patent: Apr. 14, 1992

[54] METHOD AND APPARATUS FOR MEASURING AND CONTROLLING COMBUSTION PHASING IN AN INTERNAL COMBUSTION ENGINE

[75] Inventors: Peter G. Hartman, Worcester; Robert W. Law, Acton, both of Mass.

[73] Assignee: Barrack Technology Limited, Perth, Australia

[21] Appl. No.: 507,643

[22] Filed: Apr. 11, 1990

[51] Int. Cl.$^5$ .................. F02D 41/14; G01L 23/16
[52] U.S. Cl. .................. 123/435; 123/494; 73/116
[58] Field of Search .......... 123/425, 435, 494, 426; 73/35, 116

[56] References Cited

U.S. PATENT DOCUMENTS

| | | | |
|---|---|---|---|
| 3,067,610 | 12/1962 | Bockemuehl et al. | 73/35 |
| 3,978,720 | 9/1976 | Ford | 73/116 |
| 4,358,952 | 11/1982 | Mauer et al. | 73/35 |
| 4,381,748 | 5/1983 | Eckert et al. | 123/414 |
| 4,397,283 | 8/1983 | Komaroff et al. | 123/494 |
| 4,413,509 | 11/1983 | Moser et al. | 73/117.3 |
| 4,419,212 | 12/1983 | Dietz et al. | 204/424 |
| 4,425,788 | 1/1984 | Franke et al. | 73/35 |
| 4,437,334 | 3/1984 | Laurenz | 73/35 |
| 4,444,043 | 4/1984 | Hattori et al. | 73/35 |
| 4,444,169 | 4/1984 | Kirisawa et al. | 123/344 |
| 4,446,723 | 5/1984 | Boning et al. | 73/35 |
| 4,463,729 | 8/1984 | Bullis et al. | 123/478 |
| 4,487,184 | 12/1984 | Böning et al. | 123/425 |
| 4,492,108 | 1/1985 | Van Zanten | 73/35 |
| 4,651,562 | 3/1987 | Day | 73/116 |
| 4,658,794 | 4/1987 | Day | 123/501 |
| 4,739,731 | 4/1988 | Häbich et al. | 123/494 |
| 4,760,830 | 8/1988 | Bullis et al. | 123/501 |
| 4,779,455 | 10/1988 | Kuroiwa et al. | 73/116 |
| 4,887,574 | 12/1989 | Kuroiwa et al. | 123/425 |
| 4,919,099 | 4/1990 | Extance et al. | 123/425 |
| 4,930,478 | 6/1990 | Plee et al. | 123/425 |
| 4,940,033 | 7/1990 | Plee et al. | 123/425 |

FOREIGN PATENT DOCUMENTS

WO89/11031 11/1989 World Int. Prop. O. .......... 123/425

OTHER PUBLICATIONS

R. A. Pinnock, P. Extance and C. P. Cockshott; Combustion Sensing Using Optical Fibres; 12-15 Oct., 1988.
Donald J. Remboski, Jr., Steven L. Plee and Jay K. Martin; An Optical Sensor for Spark-Ignition; Engine Combustion Analysis and Control; Feb. 27, 1989.
Lucas Automotive, Gasoline Engine Systems Division; Adaptive Ignition Control.
E. Day and B. J. Mehallick; Officially Measured Engine Timing.
M. Takata, T. Ogawa, F. Kobayashi and S. Ikeda; Development of Optical Combustion Timing Sensor for a Diesel Engine.
Vanzetti Systems, Inc.; Combustion Process Monitor for Automobile Engines and Instrumentation Proposal.

Primary Examiner—Andrew M. Dolinar
Attorney, Agent, or Firm—Harness, Dickey & Pierce

[57] ABSTRACT

An internal combustion engine is provided having a luminosity detector and an arrangement for measuring and controlling combustion phasing based on the location of particular gain independent parameters of the luminosity signal. The gain independent luminosity parameters are used to provide a basis for adjusting various parameters of the engine like fuel injection timing so that at least one gain independent parameter is located at a desired timing point in the combustion cycle to control combustion phasing. Alternatively, these gain independent luminosity parameters are used to determine the time in the combustion cycle at which certain combustion conditions occur. In this embodiment, the determined time of a combustion condition provides a basis for adjusting engine parameters so that the combustion condition occurs at a desired time in the combustion cycle to control combustion phasing.

12 Claims, 25 Drawing Sheets

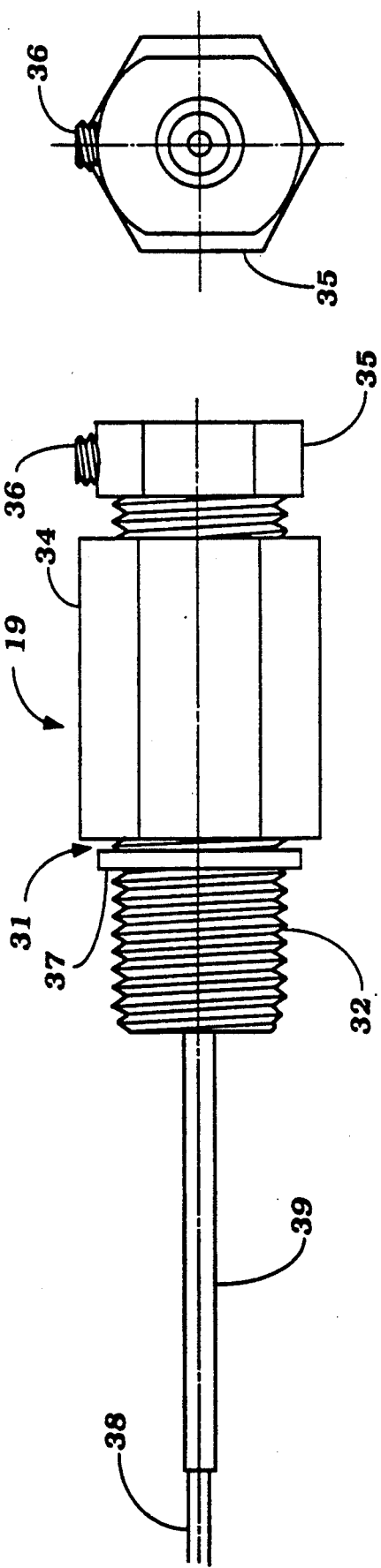

Comparison of Pressure, Luminosity and Heat Release Rate

COMBUSTION PHASING CONTROLLER

METHOD AND APPARATUS FOR MEASURING AND CONTROLLING COMBUSTION PHASING IN AN INTERNAL COMBUSTION ENGINE

BACKGROUND OF THE INVENTION

This invention relates to a method and apparatus for measuring and controlling combustion phasing in an internal combustion engine, and more particularly to an improved method and apparatus for measuring and controlling combustion phasing in a compression ignited or diesel engine based on conditions sensed in the combustion chamber using a luminosity probe and its luminosity output signal.

With modern technology and electronics, many of the operating and running conditions of an internal combustion engine can be controlled more accurately than with previous mechanical systems. For example, the control of the air/fuel ratio, spark timing, fuel injection timing and pulse width, and other adjustable factors of engine operation are greatly facilitated through the use of electronic components and electronic computers. However, in order to accurately sense the running of the engine and various phenomena occurring within the combustion chamber, it is necessary to provide a sensor that is directly positioned within the combustion chamber or in proximity to it and which senses the actual combustion conditions in the chamber.

It has been understood that knocking can be determined by an optical sensor that operates within the combustion chamber and which senses the luminosity of the gases in that chamber. A wide variety of knock detectors have been proposed that employ such sensors.

A type of engine sensor has been proposed that senses the actual luminosity of the gases within the combustion chamber. A wide variety of patents illustrating and describing the use of such sensors have issued including the following:
4,358,952; 4,369,748; 4,377,086; 4,393,687; 4,409,815; 4,412,446; 4,413,509; 4,419,212; 4,422,321; 4,422,323; 4,425,788; 4,468,949; 4,444,043; 4,515,132.
For the most part, these patents disclose arrangements wherein the sensor is utilized to sense only total luminosity and to equate the luminosity signal to a knocking signal.

However, the inventors have discovered that luminosity in the combustion chamber and, in particular, various gain independent parameters of the luminosity signal or curve can be used to determine the time at which various combustion conditions are occurring in the combustion chamber and can also be used to determine and control combustion phasing in an internal combustion engine, and in particular, a diesel engine. The measurements of these luminosity parameters can be incorporated into an engine control loop so as to provide the desired combustion phasing under a variety of engine operating and running conditions. In such an engine control loop, the timing or phasing of combustion can be adjusted so as to maintain a desired relationship between one or more of the gain independent luminosity parameters and output shaft or crank angle, or other timing point in the combustion cycle which corresponds to a desired combustion phasing. Alternatively, the combustion phasing can be controlled based on a predicted angle or time of occurrence of a certain combustion condition resulting from the luminosity measurement. Combustion phasing can then be adjusted so that the combustion condition occurs at the desired time in the combustion cycle, i.e., at a desired crank or output shaft angle, to attain the proper combustion phasing. These luminosity based measurements can be done on a cycle to cycle basis and individually for each cylinder of a multi-cylinder engine, and can also be done independent of variations in engine parameters such as engine speed, fuel delivery, air/fuel ratio, intake manifold pressure and temperature and injection system variations.

Control of combustion phasing can, in turn, be used to control the efficiency of the engine, fuel consumption, engine noise, peak cylinder pressure and harmful or undesirable exhaust emissions, particularly in diesel engines which emit higher quantities of exhaust smoke, particulate matter and oxides of nitrogen in comparison to spark ignited engines. Control of combustion phasing can also be used to aid engine starting.

It is, therefore, a principal object of this invention to provide an improved apparatus and method for operating an engine, and in particular a diesel engine, wherein a luminosity detector and various gain independent parameters of its luminosity signal or curve are used to control combustion phasing under a variety of engine operating and running conditions.

It is a further object of this invention to provide an improved method and apparatus for operating an engine, preferably of the diesel type, wherein various gain independent luminosity parameters are used to determine the time, which can be measured in relation to crank angle, at which certain combustion conditions are occurring in the combustion cycle, which, in turn, is used to determine and control combustion phasing under a variety of engine operating and running conditions.

It is another object of this invention to provide an improved apparatus and method for operating an engine wherein the combustion phasing of the engine can be corrected in response to various gain independent parameters of the luminosity signal so as to provide better running of the engine under a variety of engine operating and running conditions.

It is still a further object of this invention to provide an improved apparatus and method for operating an engine wherein the combustion phasing of the engine can be determined and adjusted so as to reduce cycle to cycle variations and chamber to chamber variation in multi-cylinder engine.

It is a still further object of this invention to provide engine control systems wherein the combustion phasing of the engine can be controlled in direct response to the luminosity signal, or in response to the predicted time in the combustion cycle at which certain combustion conditions occur, which is based on the luminosity signal. For example, the luminosity signal can be used to predict the output shaft or crank angle at which such combustion conditions as peak cylinder pressure, peak rate of change of pressure, start of combustion, peak rate of heat release, and 50% mass burn fraction occur. These predicted angles at which these combustion conditions occur would then provide the basis for controlling combustion phasing.

It is yet a further object of this invention to provide an improved apparatus and method for operating an engine, particularly a diesel engine, wherein the combustion phasing of the engine can be controlled so as to control or maintain $NO_x$ emissions, particulate/soot emissions, combustion related noise and fuel consumption.

SUMMARY OF THE INVENTION

This invention is adapted to be embodied in a method for operating an internal combustion engine, preferably a diesel engine, and an apparatus therefor that has a combustion chamber and means for forming a combustible air/fuel mixture within the combustion chamber. In accordance with this embodiment of the invention, the luminosity in the combustion chamber is sensed or detected. A curve is generated based on the detected luminosity and the location of at least one gain independent parameter of the luminosity curve is determined, such as start of luminosity, in relation to a timing point in the combustion cycle such as output shaft or crank angle. At least one parameter of the engine such as fuel injection timing is adjusted s that at least one gain independent parameter is located at a desired timing point in the combustion cycle such as a desired output shaft or crank angle so as to control combustion phasing.

A second embodiment of this invention is also adapted to be embodied in a method for operating an internal combustion engine, preferably a diesel engine, and an apparatus therefor that has a combustion chamber and means for forming a combustible air/fuel mixture within the combustion chamber. In accordance with this embodiment of the invention, the luminosity in the combustion chamber is detected and a curve is generated based on the detected luminosity The location of at least one gain independent parameter of the luminosity curve is determined, such as start of luminosity, in relation to a timing point in the combustion cycle, and the time in the combustion cycle at which at least one combustion condition occurs is measured such as location of peak pressure in the combustion chamber based on the determined location of at least one gain independent parameter so as to control combustion phasing. Combustion phasing is controlled by adjusting at least one parameter of the engine so that the time of at least one measured combustion condition occurs at a desired time in the combustion cycle.

BRIEF DESCRIPTION OF THE DRAWINGS

FIG. 1A is an enlarged outline view of a fiber optic probe for use with this invention.

FIG. 1B shows the rear housing and set screw of FIG. 1A

DETAILED DESCRIPTION OF THE PREFERRED EMBODIMENTS

Figure 1:
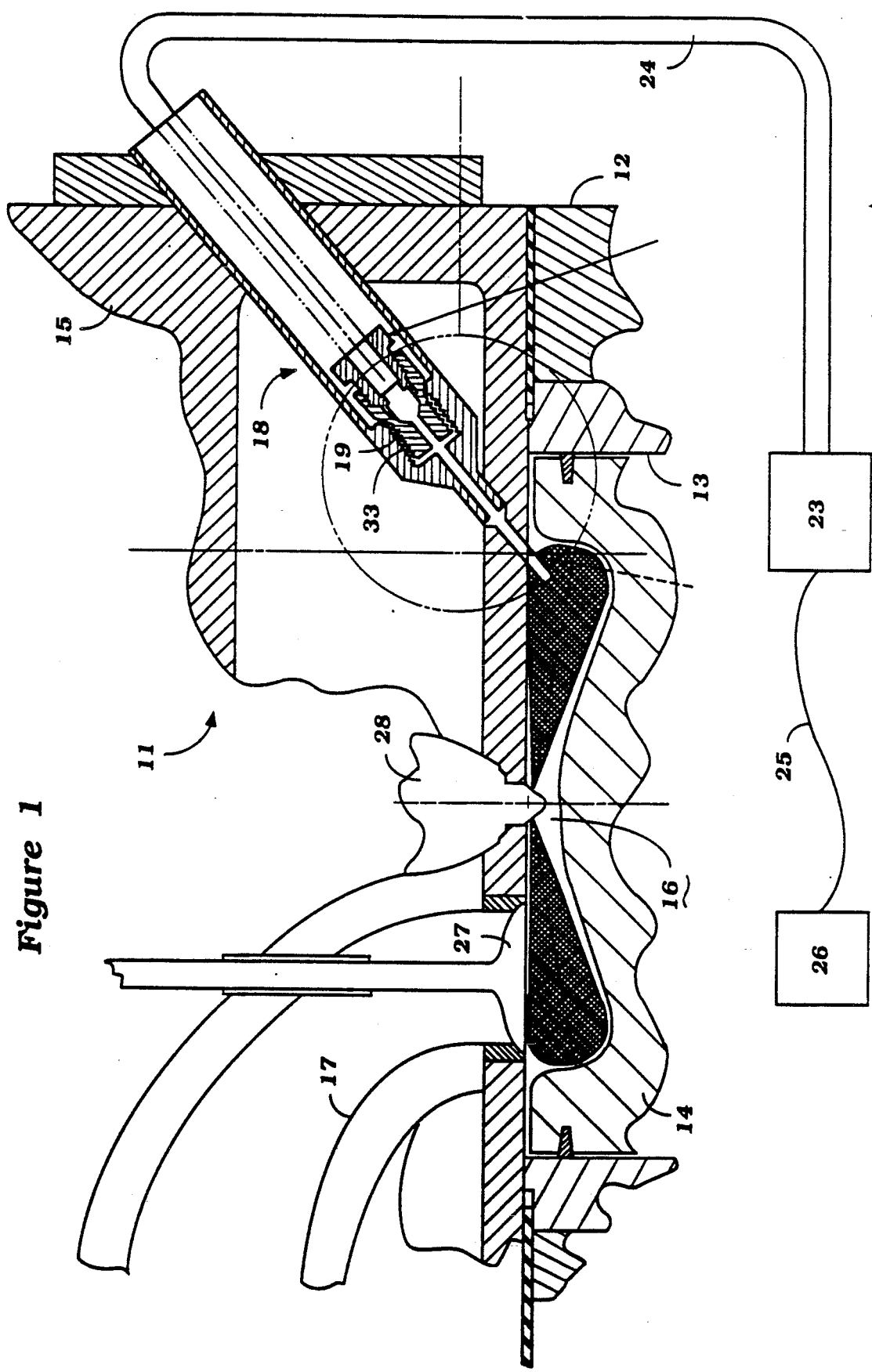
FIG. 1 illustrates a cross sectional view taken through a single combustion chamber of a multi-cylinder internal combustion engine constructed and operated in accordance with embodiments of the invention

Referring to FIG. 1 of the drawings, a cross-section of a portion of a multi-cylinder internal combustion engine is identified generally by the reference numeral 11. It is to be understood that, although the invention has particular utility in multi-cylinder engines, the invention is also applicable in single cylinder engines. Also, although the invention is described in conjunction with a reciprocating type engine, the principals of the invention may be utilized with engines of the non-reciprocating type, such as rotary engines, and with engines operating on two stroke or four stroke cycles.

Inasmuch as the invention is concerned primarily with the combustion chamber and the conditions therein, only a cross sectional view taken through one of the combustion chambers is shown. This cross sectional view shows a cylinder block 12 having a cylinder bore 13 in which a piston 14 is supported for reciprocation. The piston 14 is connected by means of a connecting rod (not shown) to a crankshaft (not shown) for providing output power from the engine 11.

A cylinder head 15 is affixed in a known manner to the cylinder block 12 which cooperates with the cylinder bore 13 and head of the piston 14 to provide a chamber of variable volume 16, sometimes referred to hereinafter as the combustion chamber.

An intake port 17 and an exhaust port (not shown) extend through the cylinder head 15 and have their communication with the combustion chamber 16 controlled by poppet type intake valves 27 and exhaust valves (not shown) for admitting a charge to the combustion chamber 16 and for discharging the burnt charge from the combustion chamber 16. It is to be understood, of course, that the combustion chamber 16 may have a plurality of intake and exhaust valves and that the engine 11 may include a plurality of combustion chambers 16.

The charge admitted to the combustion chamber 16 may comprise pure air or an air/fuel mixture that is formed by a suitable charge former such as a port or throttle body type fuel injector or carburetor. Alternatively, if pure air is delivered or injected into combustion chamber 16, direct cylinder injection via a fuel injector 28 may be employed for delivering fuel into the combustion chamber 16 to form the air/fuel mixture. The fuel delivery and thus the air/fuel ratio may be controlled in any of a wide variety of known manners such as by means of throttle valves, fuel control valves, injection duration, injection rate, injection pulse width, etc. In accordance with the invention, these engine parameters may be adjusted manually or automatically as part of an engine control loop so as to control combustion phasing.

The engine 11 is preferably of the compression ignition or diesel type. Accordingly, the following discussion is concerned primarily with a diesel engine. In an engine 11 of the diesel type, combustion is initiated through the timing of the direct cylinder fuel injection, or in any of the other known manners normally employed in connection with diesel engines. If, on the other hand, the engine 11 is of the spark ignited type, a spark plug will be carried in the cylinder head 15 and have its gap exposed in the combustion chamber 16. The spark timing is controlled by a suitable mechanism which may be of any conventional type.

As has been previously noted, the invention is capable of embodiment in a variety of conventional types of internal combustion engines and, for that reason, the details of the engine construction are not necessary to understand how the invention can be practiced by those skilled in the art.

However, in accordance with the invention there is provided a luminosity detector indicated generally by the reference numeral 18. The luminosity detector 18 includes a fiber optic probe 19 which may be of any known type or other type of optical access which extends through the cylinder head 15 and has its end terminating at or within the combustion chamber 16.

Referring now to FIGS. 1, 1A and 1B, the probe 19 is comprised of a mounting housing 31 that has a threaded end 32 which is received in a threaded opening 33 formed at the base of a counterbore. The mounting housing 31 may be formed from any suitable material, such as those materials used for the body of a spark plug. The housing 31 includes a front housing 34, and a rear housing 35 is adapted for threaded engagement with the front housing 34. A fiber optic cable 24 is held in place by a set screw 36. A gasket 37 is provided for securely fitting he probe 19 in place.

An optic element 38 is affixed within the housing 31 in a suitable manner and has portion that extends beyond the threaded end 32 and which is encapsulated within a shield 39. A smaller portion or tip of the optic element 38 protrudes into the combustion chamber 16 as shown in FIG. 1. The optic element 38 is held in place by a compression fitting that is inside the front housing 34.

A probe having a diameter of 0.06" has been found to be practical and makes it relatively easy to install in the cylinder head 15. The probe 19 can be formed from a relatively inexpensive material such as synthetic sapphire ($Al_2O_3$) or other materials having similar characteristics. Reference may be had to the copending application entitled "Luminosity Detector", Ser. No. 467,883, filed Jan. 22, 1990, in the name of Donald J. Remboski, et al., and assigned to the assignee of this application for details concerning the construction of a fiber optic probe 19 for use with this invention. The disclosure of that application is incorporated herein by reference. Other known types of probes may also be used.

Because the majority of radiation in a diesel combustion chamber is from soot radiation, except perhaps very early or late in the cycle, the probe 19 is particularly adapted to detect soot emission in the combustion chamber 16, although the probe 19 will also detect emission of various gases in the combustion chamber 16.

Although it may be desirable to provide a monoohromator in front of or on the detector 23 to select the desired wavelength of light which is being measured when the probe 19 is used to sense gases in the combustion chamber 16, it has been found that detection of overall radiant emission in the diesel engine does not require a monochromator or an optical filter. This is because the majority of the radiant emission in a diesel results from incandescent soot particles and has a continuous wavelength spectrum. Thus, the wavelength range is limited only by the characteristics of the silicon photo detector 23, which for this application is typically between 400 and 1000 nm. These figures are exemplary only and various modifications may be employed within the scope of the invention.

The majority of the diesel combustion process is characterized by a turbulent diffusion flame instead of a hydrocarbon flame which results from a premixed mixture and occurs in spark ignited engines. As a result, the gas emission is normally overwhelmed by the soot emissions from the diffusion flame so as to produce a yellow flame. Unlike emission from gaseous components, soot radiation varies continuously with wavelength. For example, a soot particle at 2000 degrees K will emit radiation continuously between 200 nm and 100,000 nm. The radiation intensity at a given wavelength is a function of soot temperature, quantity of soot present and soot emissivity (usually near one). The measurement of this radiation is influenced by the view characteristics of the fiber optic probe 19.

In the illustrated embodiment, the probe 19 is connected to the fiber optic cable 24 for transmitting its light signal from the combustion chamber 16 to a remotely positioned silicon photo detector 23. The remote detector 23 is connected to a remotely positioned computer control unit 26 by means of conductors 25. In addition to converting the voltage signal from the silicon photo detector 23 to an output indicative of luminosity, the remotely positioned control unit 26 which may measure certain engine parameters as well, may also receive input signals from other sensors normally employed on the engine, for example, air/fuel ratio, intake manifold pressure and temperature, and engine speed sensors. These types of sensors are normally employed with modern internal combustion engines and their signals can be processed in conjunction with the luminosity signal to provide certain measured characteristics of engine operation. The remotely positioned control unit 26 may be of any suitable type and is particularly adapted to transmit the signal from the detector 23 into an output indicative of luminosity within the combustion chamber 16.

Figure 2:
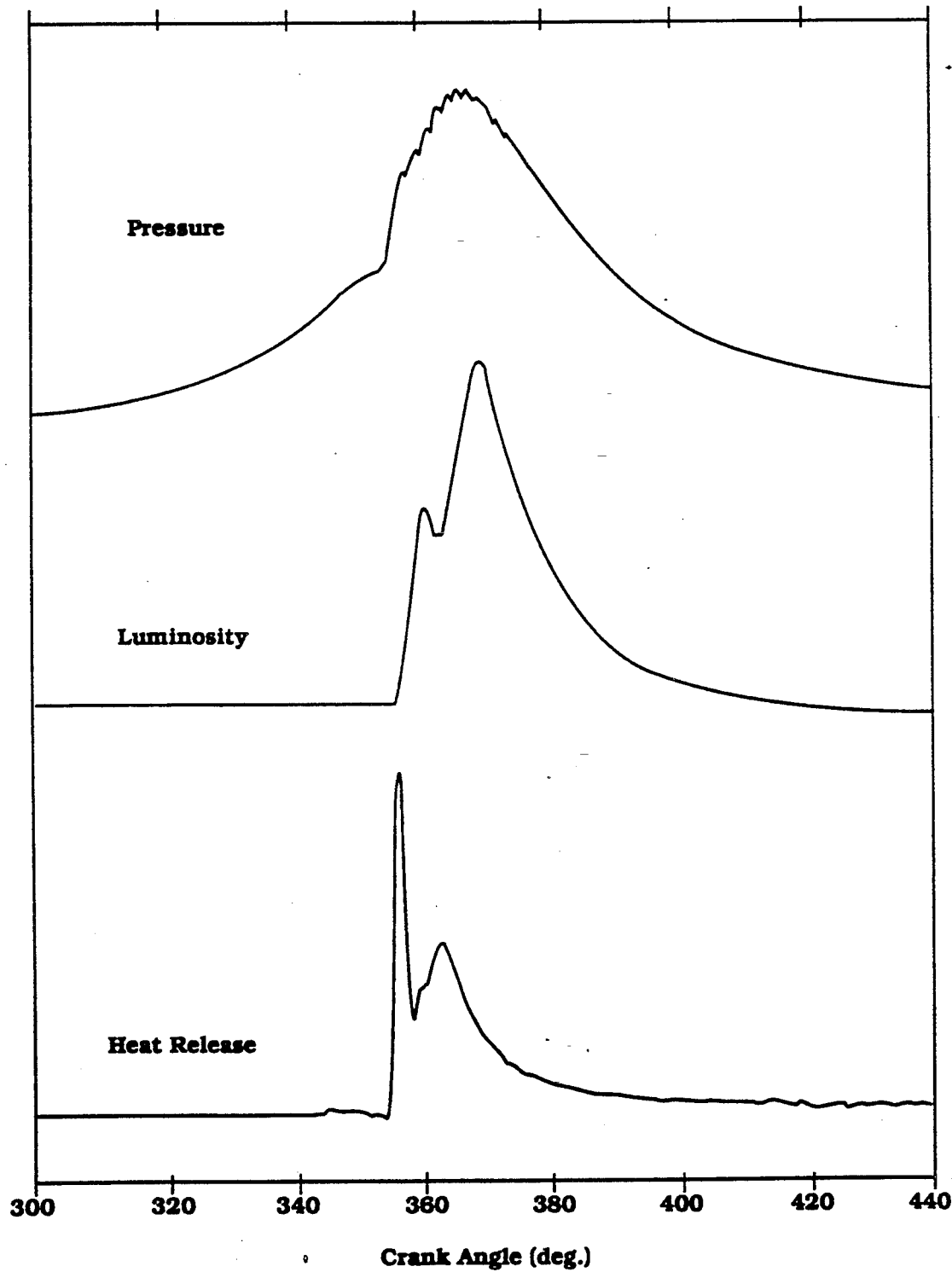
FIG. 2 shows the relationship between the measured luminosity, cylinder pressure and heat release rate as a function of crank angle.

A typical luminosity signal as a function of crank angle measuring radiant emission in a diesel combustion chamber is shown in FIG. 2, and is compared to a signal indicative of cylinder pressure determined by a water-cooled pressure transducer and to a signal indicative of heat release rate measured using a single-zone heat release model. As shown in FIG. 2, the peak radiant emission typically lags both heat release and pressure to a small extent. There is negligible emission during the compression process until the beginning of the diffusion-burn phase, which is the dominate mode of combustion in diesel engines. The signal persists after heat release due to radiation from hot soot particles.

It should be noted that the measurement of the various gain independent parameters of the luminosity signal in relation to crank angle assumes a reciprocating type engine. However, in non-reciprocating engines, these measurements can be done in relation to output shaft angle. These luminosity measurements can be also be done in relation to any other means which provides an indication of time in the combustion cycle.

It has been found that the time in the combustion cycle at which various combustion conditions occur can be determined by the luminosity probe 18 in a diesel engine and its signals employed to adjust parameters of the engine such as fuel delivery including injection timing, duration and pulse width to control combustion phasing. The control circuitry and mechanism for adjusting such engine parameters in response to the luminosity signals are believed to be within the scope of those of ordinary skill in the art once they understand that the luminosity signal, and in particular, various gain independent parameters of that signal can be used to measure the timing of certain combustion conditions and to determine and control combustion phasing.

Gain independent luminosity parameters, as the name implies, are not affected by variations in the gain of the signal, as are gain dependent parameters. The advantage in using gain independent luminosity parameters to determine combustion conditions and to determine and control combustion phasing is that the luminosity measurements are not affected when the gain of the signal decreases over time due to deposits on the probe 19, etc. The use of gain independent luminosity parameters to correlate the data avoids the problem of a diminishing luminosity signal over time, since the correlations are based on characteristics other than amplitude. An example of a parameter that is gain independent is location of peak luminosity ($caL_{max}$). As long as the luminosity signal maintains a sufficient signal to noise ratio, the location of peak luminosity in crank angle degrees will remain the same regardless of gain changes in the luminosity signal.

Data for the gain independent correlations were obtained under a variety of engine operating and running conditions, including variations in engine speed (600, 900, 1200, 1800 rpm), air/fuel ratio (idle, 60, 40, 20, 18), injection timing (0, 3, 6, 9, 12 and 18 degrees before top dead center), intake manifold temperature and pressure, water jacket temperature and fuel temperature. A single cylinder of a 1.846 liter, direct fuel injected, diesel engine was used having a compression ratio of 16.0, a bore of 130 mm, a stroke of 139 mm, and four valves per cylinder. The following gain independent luminosity parameters were found to be important in the detection and control of combustion phasing, and in determining the time in the combustion cycle at which certain combustion conditions occur. All of these parameters are in units of crank angle degrees.

$SOI_x$ = location at which the luminosity first equals or is slightly greater than x% of peak luminosity.

$EOl_x$ = location at which the luminosity last equals or is slightly less than x% of peak luminosity.

$IOL_x$ = location at which the integral of luminosity equals or is slightly greater than x% of the total integrated luminosity.

$SOL_0$ = start of luminosity determined by extrapolation, for example, of the angles of $SOL_5$ and $SOL_{10}$ to find the effective angle of zero luminosity.

$X_{cp}$ x-coordinate of the centroid of luminosity signal.

The determination of any of these luminosity parameters can be used to control combustion phasing. For example, location in crank angle degrees at which the luminosity first equals or is slightly greater than 50% of peak luminosity ($SOI_{50}$) can be determined and can be compared with a desired location for that parameter which corresponds to a desired combustion phasing. One or more of the engine's adjustable parameters can then be varied so that the point at which the luminosity first equals or is slightly greater than 50% of peak luminosity occurs at a desired crank angle location, corresponding to the desired combustion phasing. These luminosity measurements can be done during each cycle of operation of the engine to control combustion phasing from cycle to cycle or they can be determined using a number of cycles using any appropriate weighting, averaging or filtering schemes.

In addition, various empirical correlations have been developed by the inventors which relate the location or time in the combustion cycle of various gain independent parameters of the luminosity curve to such engine operating parameters and combustion conditions as location of peak pressure ($caP_{max}$), location of peak rate of change of pressure ($cadP_{max}$), start of combustion (SOC), end of combustion (EOC) defined as the location of 90% mass burn fraction (sometimes referred to as ca90%mfbN or CA90MBFN), location of peak rate of heat release ($cadQch_{max}$), and location of 50% mass burn fraction (ca50%MBF). These empirical correlations were established using a curve fitting routine which performs a multiple regression analysis using a quadratic response surface model for the function:
$Y = A + B_1X_1 + B_2X_2 + \cdot$
$+ B_nX_n + C_{1,2}(X_1X_2) + C_{1,3}(X_1X_3) + \cdot$
$\cdot + D_1X_1^2 + D_2X_2^2 + \ldots + D_nX_n^2$. The routine calculates regression coefficients for linear, cross product and squared terms. The correlations involve one or more gain independent luminosity parameters, and some also include engine speed (speed) in revolutions per minute as a variable. $X_1$ through $X_n$ represent the various luminosity parameters and engine speed in the equation. The various A, B, C and D terms are curved fitting parameters determined in response to the luminosity and engine data set to generate a curve fit. Each data point in the following correlations represents a 100 cycle ensemble average. The correlations set forth below used to predict the locations of the various engine operating parameters and combustion conditions take the form of the above quadratic model. The inventors then tested their predicted locations for these various engine operating parameters and combustion conditions by comparing those locations with observed locations. These comparisons using an appropriate set of linear, cross product and squared terms in the quadratic model are shown in FIGS. 3, 7, 9, 11, 16 and 18. Suitable software programs can be used which weigh the relative significance of the terms, and terms that show little significance can be removed to simplify the model as was done by the inventors. The center reference line in each of these figures indicates a one to one correlation and the reference lines on either side indicate correlations of plus or minus one crank angle degree. Trends showing the location of these various combustion conditions in relation to a specific luminosity parameter are shown in FIGS. 4 through 6, 8, 10, 12 through 15, 17, and 19 through 23.

Figure 3:
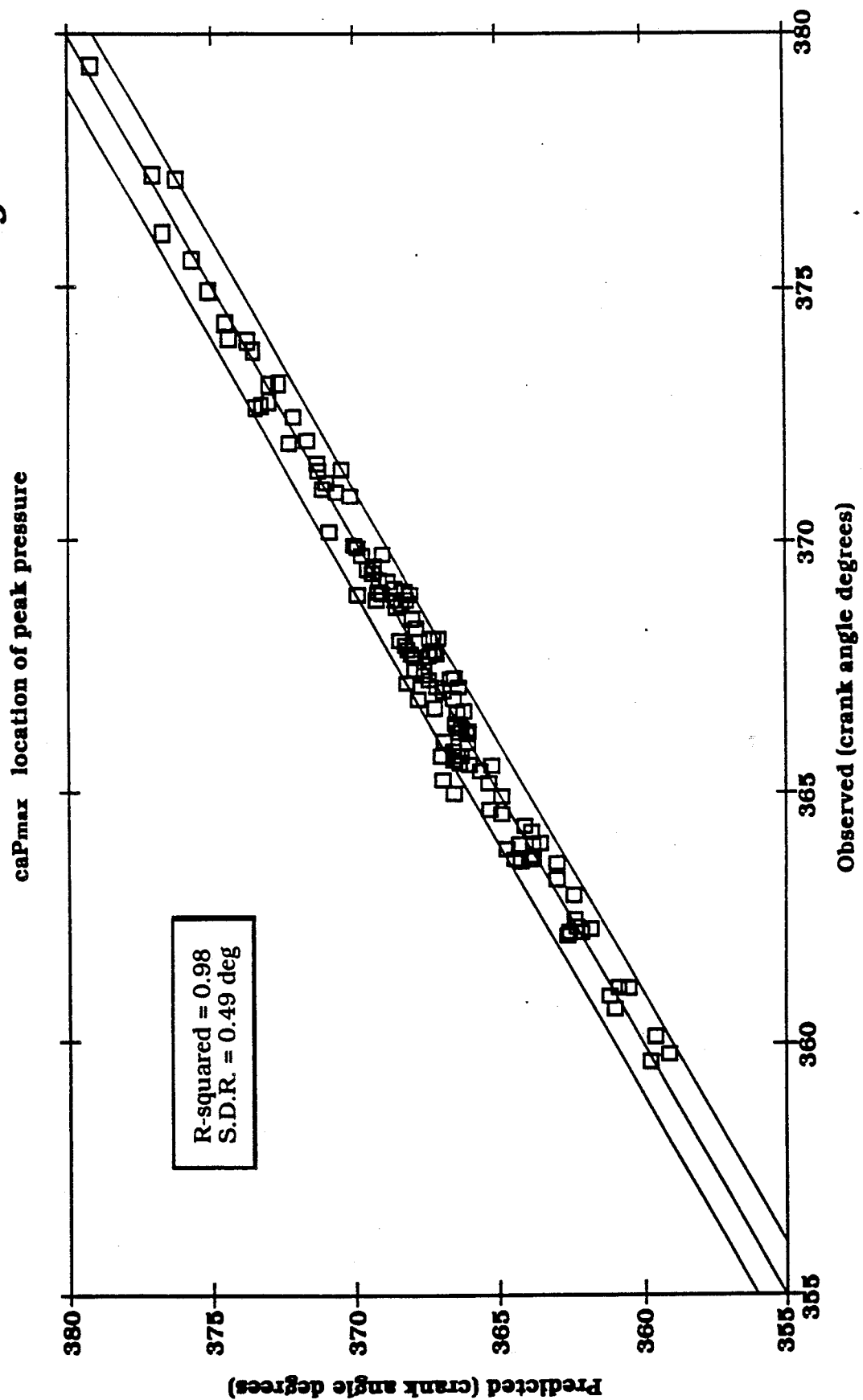
FIG. 3 shows the correlation between observed and predicted location of peak pressure in the combustion chamber in crank angle degrees using gain independent luminosity parameters and engine speed.
Figure 4:
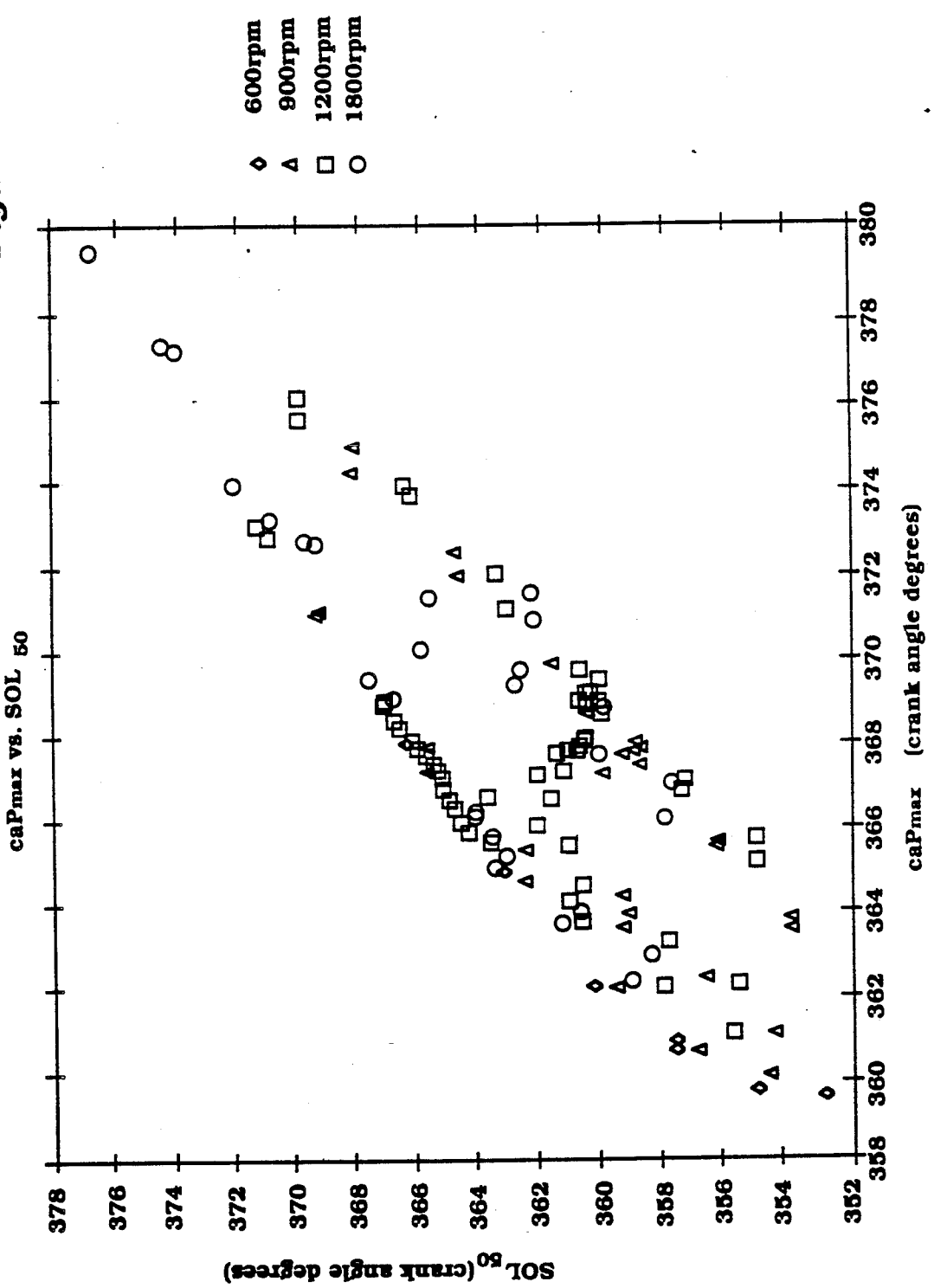
FIG. 4 shows the observed location in crank angle degrees of peak pressure within the combustion chamber as a function of the location in crank angle degrees at which the luminosity first equals or is slightly greater than 50% of peak luminosity.
Figure 5:
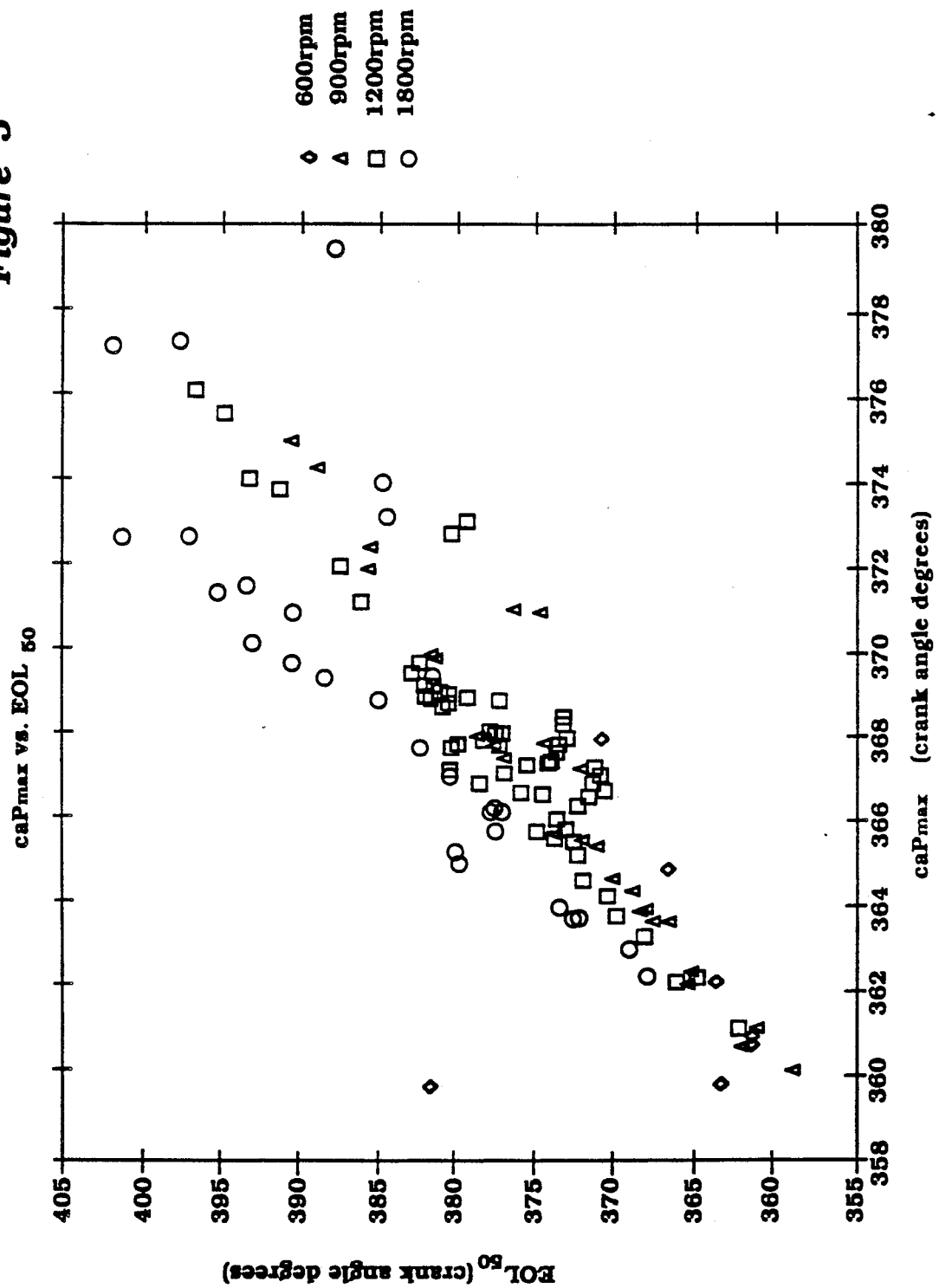
FIG. 5 shows the observed location in crank angle degrees of peak pressure within the combustion chamber as a function of the location in crank angle degrees at which the luminosity last equals or is slightly less than 50% of peak luminosity.
Figure 6:
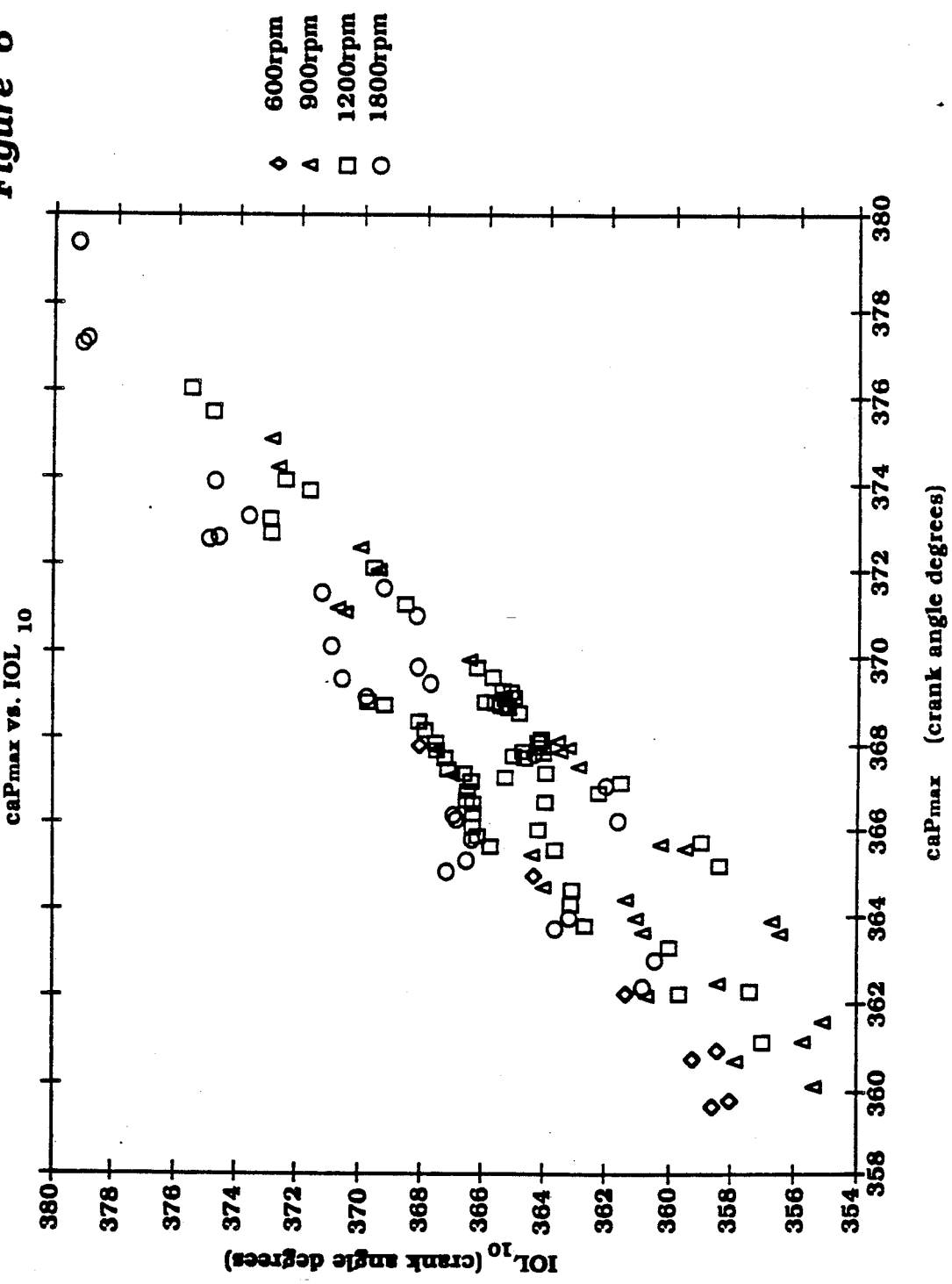
FIG. 6 shows the observed location in crank angle degrees of peak pressure within the combustion chamber as a function of the location in crank angle degrees at which the integral of luminosity equals or is slightly greater than 10% of the total integrated luminosity.

Specifically, the inventors have found that the luminosity curve can be used to give an indication of the location of peak pressure ($caP_{max}$) in crank angle degrees. The predicted value of $caP_{max}$ has been found to be a function of speed, $SOL_{50}$, $EOL_{50}$, $IOL_{10}$, where $SOL_{50}$ is the location in crank angle degrees at which the luminosity first equals or is slightly greater than 50% of peak luminosity, $EOL_{50}$ is the location in crank angle degrees at which the luminosity last equals or is slightly less than 50% of peak luminosity and $IOL_{10}$ is the location in crank angle degrees at which the integral of luminosity equals or is slightly greater than 10% of the total integrated luminosity. The relationship obtained from the data between the observed location of pea pressure determined by a pressure transducer and the predicted location based on these luminosity parameters and engine speed using the correlation routine is shown in FIG. 3. The correlation coefficient (R-squared) between the predicted and observed location of peak pressure is 0.98 with a standard deviation of residuals (S.D.R.) of 0.49 degrees. FIGS. 4 through 6 are trend plots showing the observed location of peak pressure in crank angle degrees as a function of a particular gain independent luminosity parameter measured in crank angle degrees under a variety of different engine speeds. FIG. 4 shows the relationship between $SOL_{50}$ and location of peak pressure. FIG. 5 shows the relationship between $EOL_{50}$ and location of peak pressure. FIG. 6 shows the relationship between $IOL_{10}$ and location of peak pressure.

Figure 7:
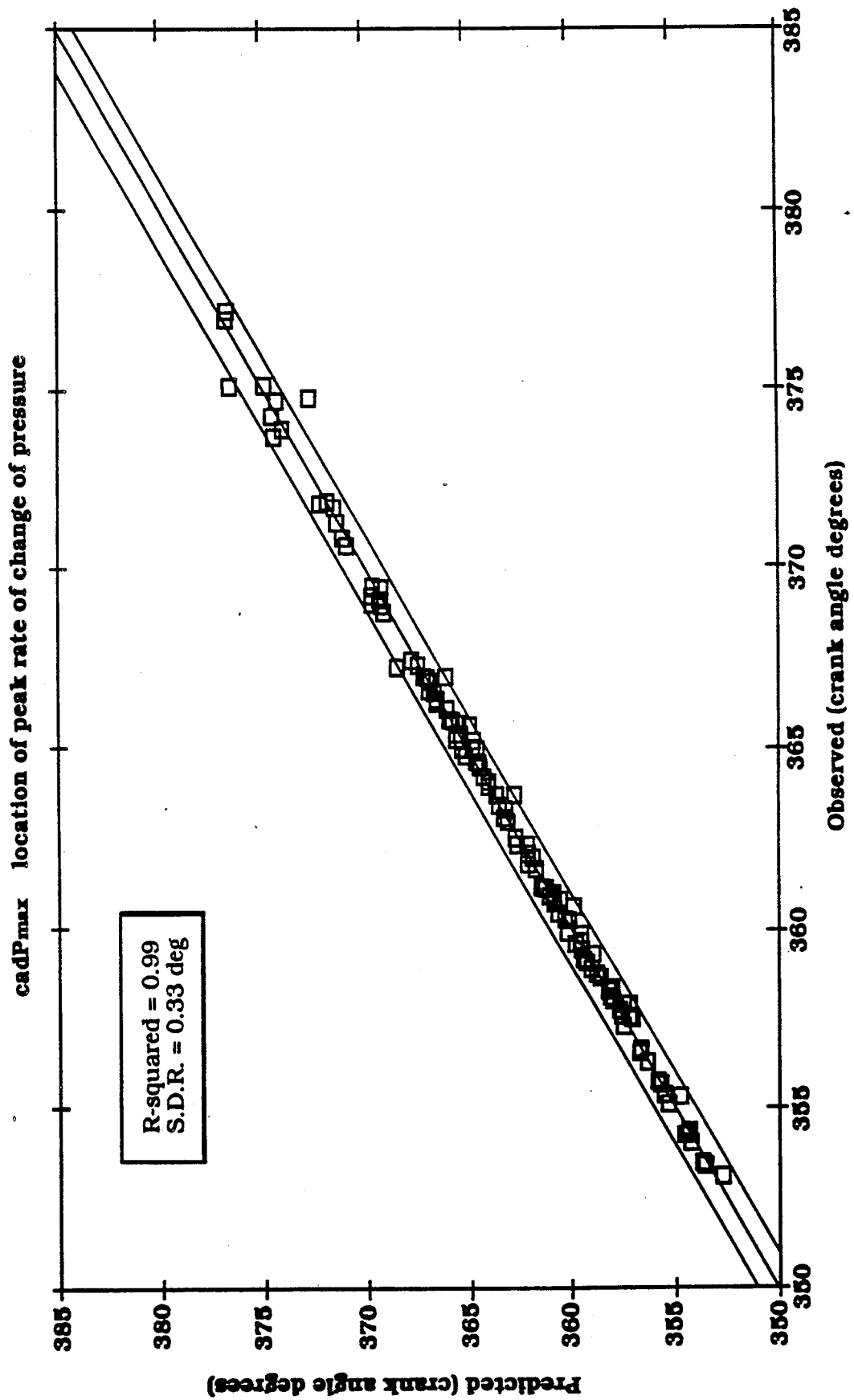
FIG. 7 shows the correlation between observed and predicted location of peak rate of change of pressure within the combustion chamber in crank angle degrees using start of luminosity.
Figure 8:
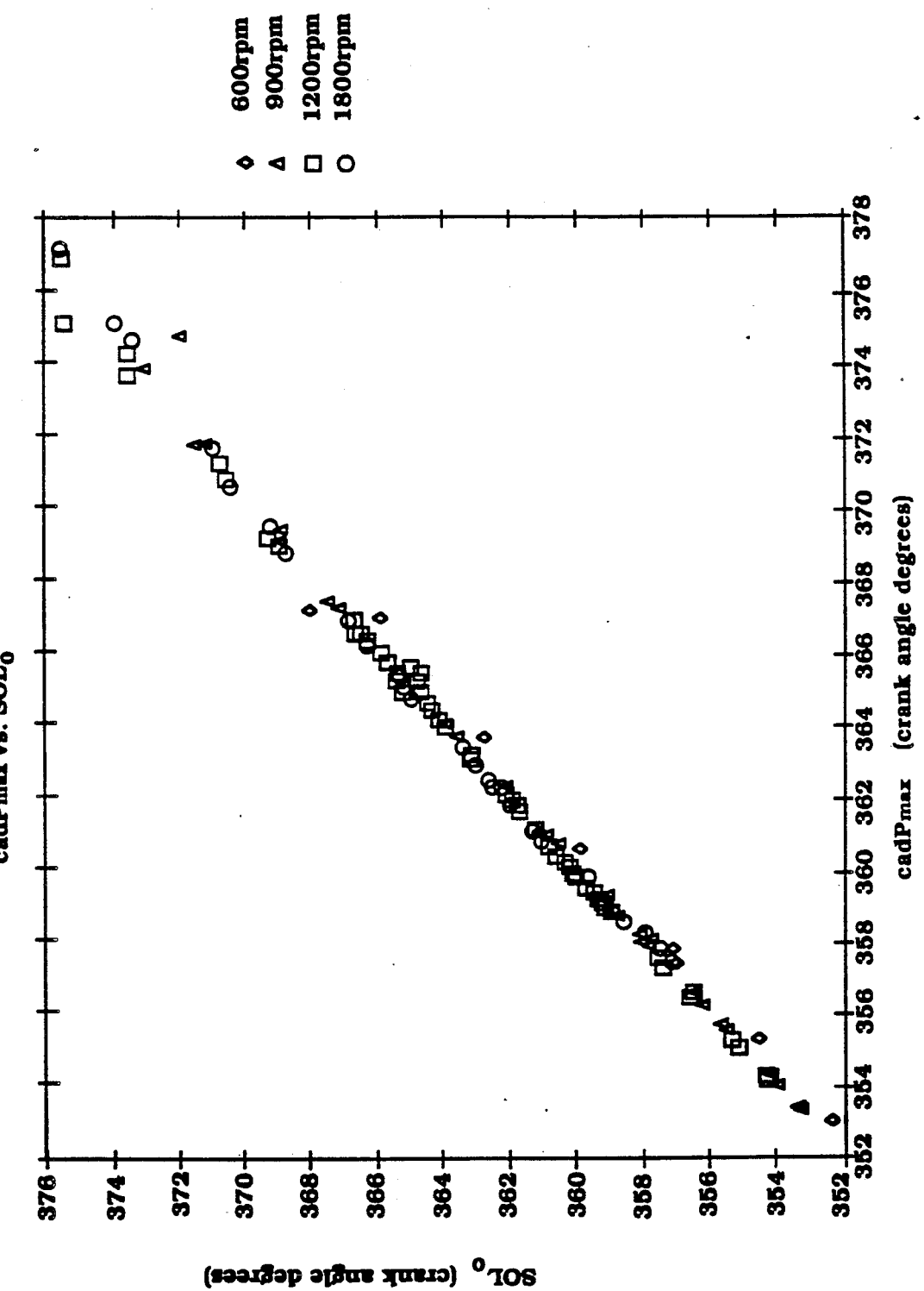
FIG. 8 shows the observed location in crank angle degrees of peak rate of change of pressure as a function of the location in crank angle degrees of start of luminosity.

Location of peak rate of change of pressure in the combustion chamber ($cadP_{max}$) can also be predicted using start of luminosity ($SOL_0$) which is determined by extrapolation, for example, of the angles of $SOL_5$ and $SOL_{10}$ to find the effective angle of zero luminosity. The relationship between the observed $cadP_{max}$ determined by a pressure transducer and the predicted $cadP_{max}$ based on the start of luminosity measurement is shown in FIG. 7. The R-squared value between the predicted and observed $cadP_{max}$ is 0.99 with an S.D.R. of 0.33 degrees. FIG. 8 shows the relationship between start of luminosity measured in crank angle degrees and observed location of peak rate of change of pressure in crank angle degrees under various engine speeds.

Figure 9:
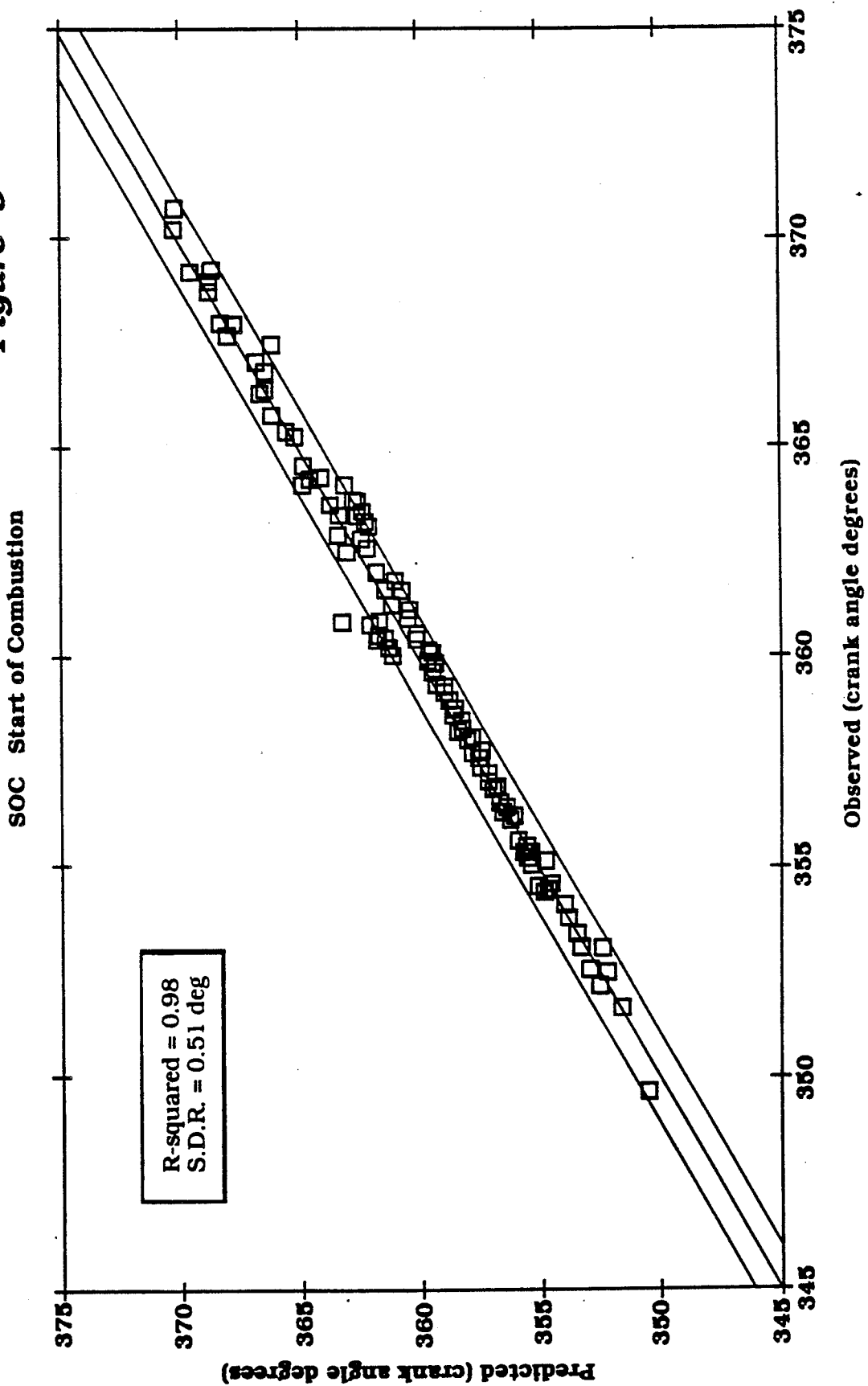
FIG. 9 shows the correlation between observed and predicted start of combustion in crank angle degrees using start of luminosity and engine speed.
Figure 10:
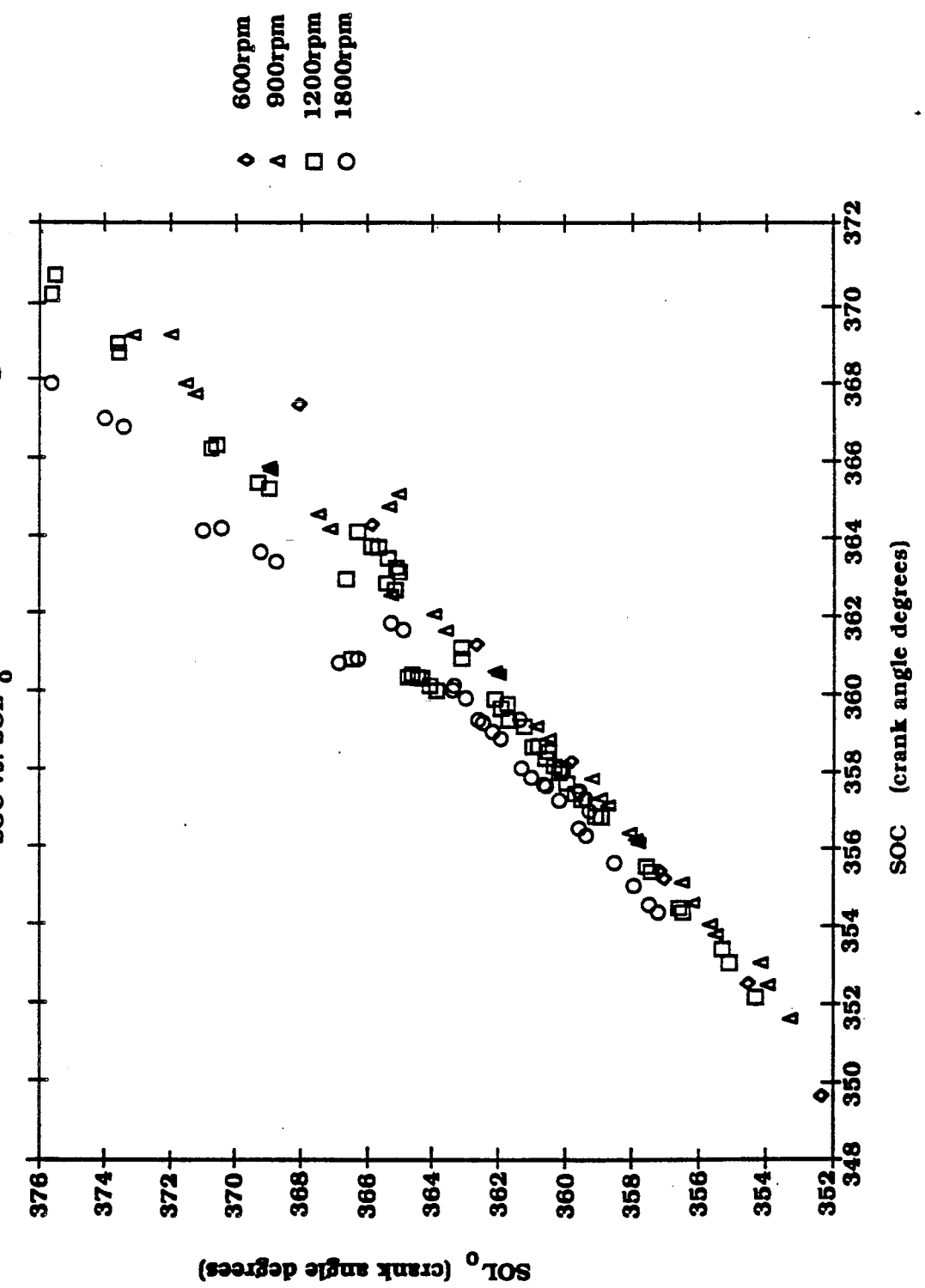
FIG. 10 shows observed start of combustion in crank angle degrees as a function of start of luminosity in crank angle degrees.

The luminosity parameters can also be used to give a good indication of start of combustion. The predicted start of combustion (SOC) is a function of speed and $SOL_0$. The correlation between observed start of combustion determined by a heat release model using a pressure transducer and predicted start of combustion based on the luminosity and engine parameters is shown in FIG. 9. The R-squared value is 0.98 with an S.D.R. of 0.51 degrees. FIG. 10 shows the relationship between start of luminosity and observed start of combustion both measured in crank angle degrees under various engine speeds.

Figure 11:
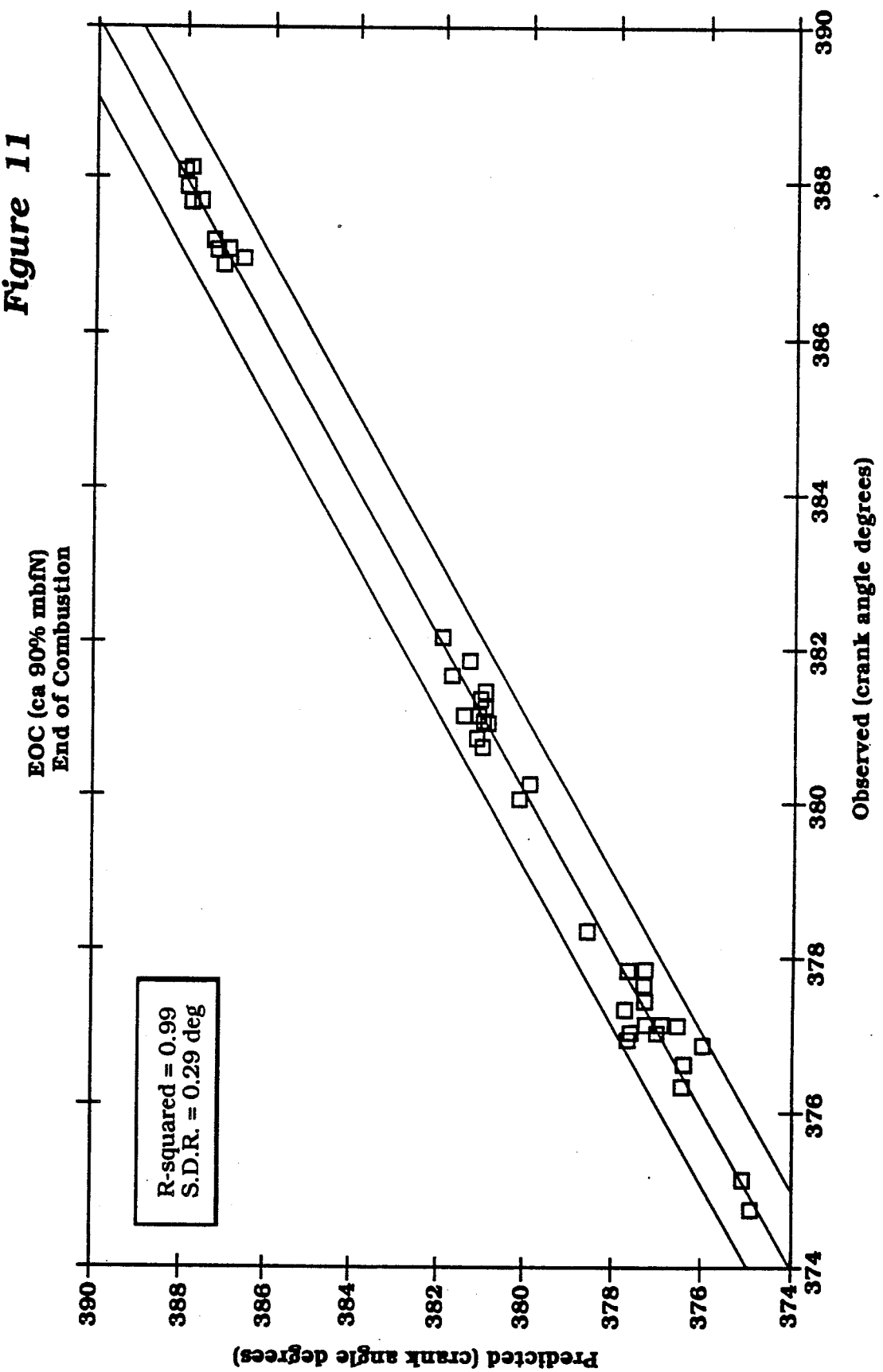
FIG. 11 shows the correlation between observed and predicted end of combustion in crank angle degrees using gain independent luminosity parameters.
Figure 12:
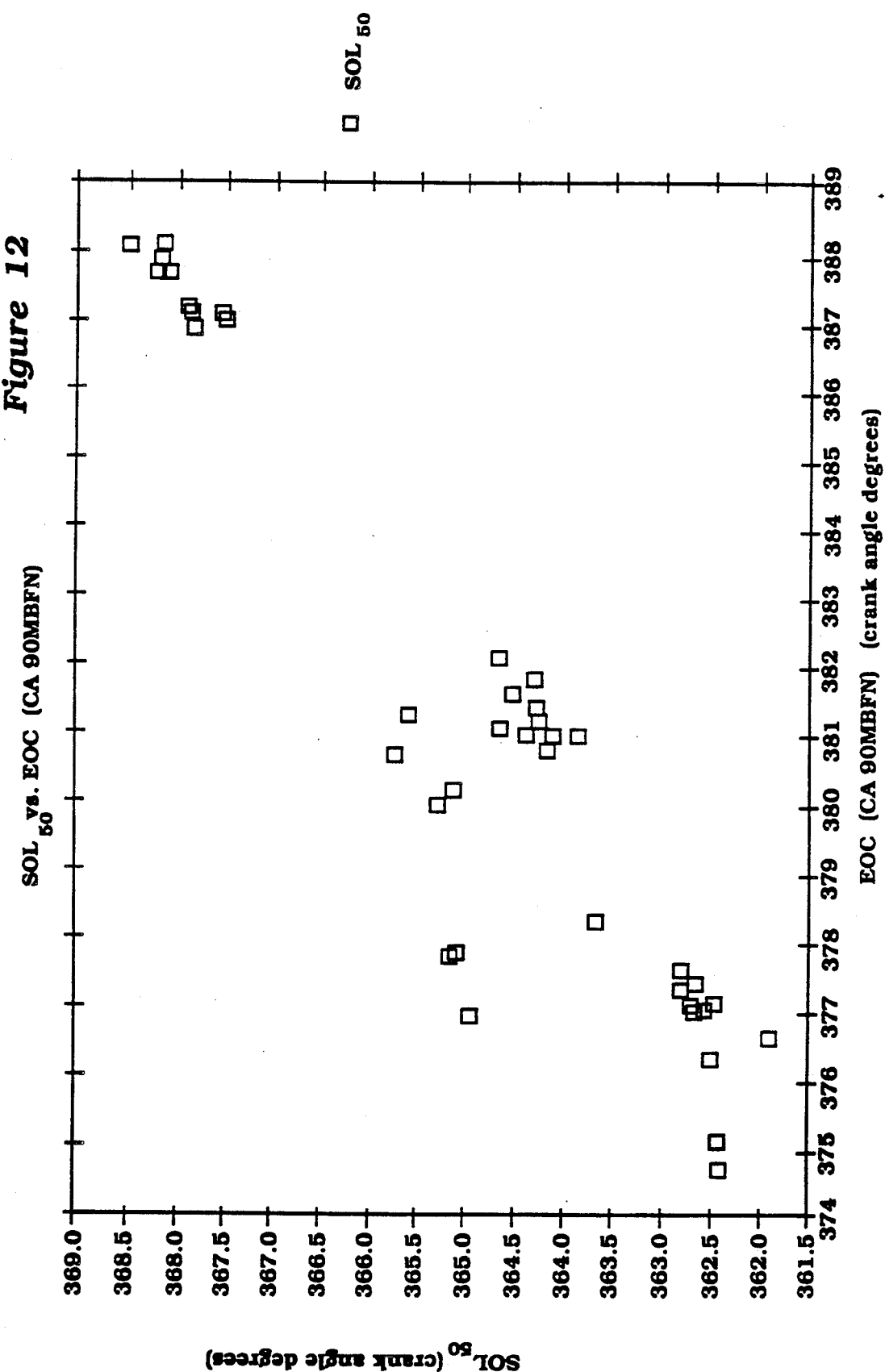
FIG. 12 shows observed end of combustion in crank angle degrees as a function of the location in crank angle degrees at which the luminosity first equals or is slightly greater than 50% of peak luminosity.
Figure 13:
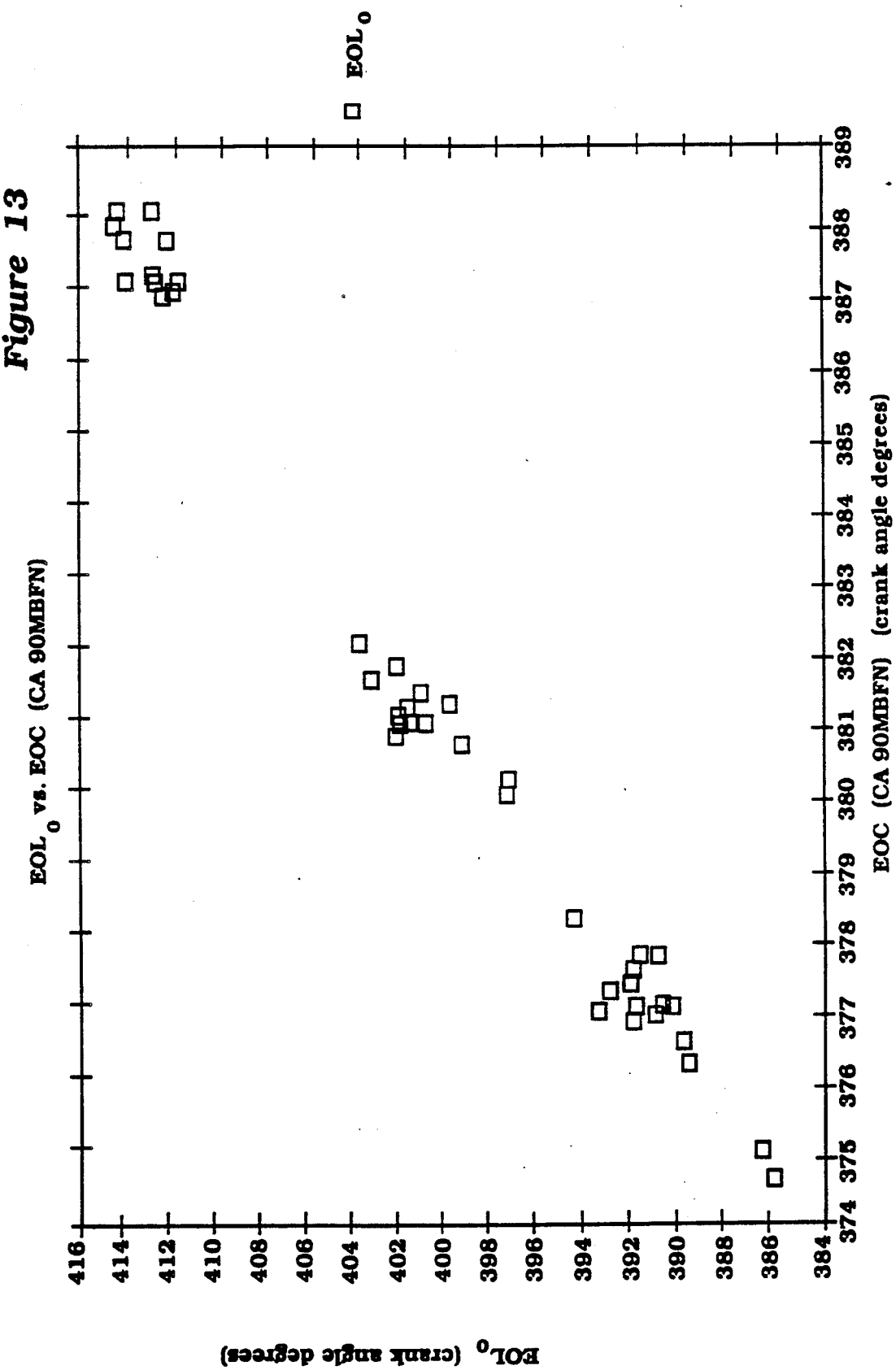
FIG. 13 shows observed end of combustion in crank angle degrees as a function of end of luminosity in crank angle degrees.
Figure 14:
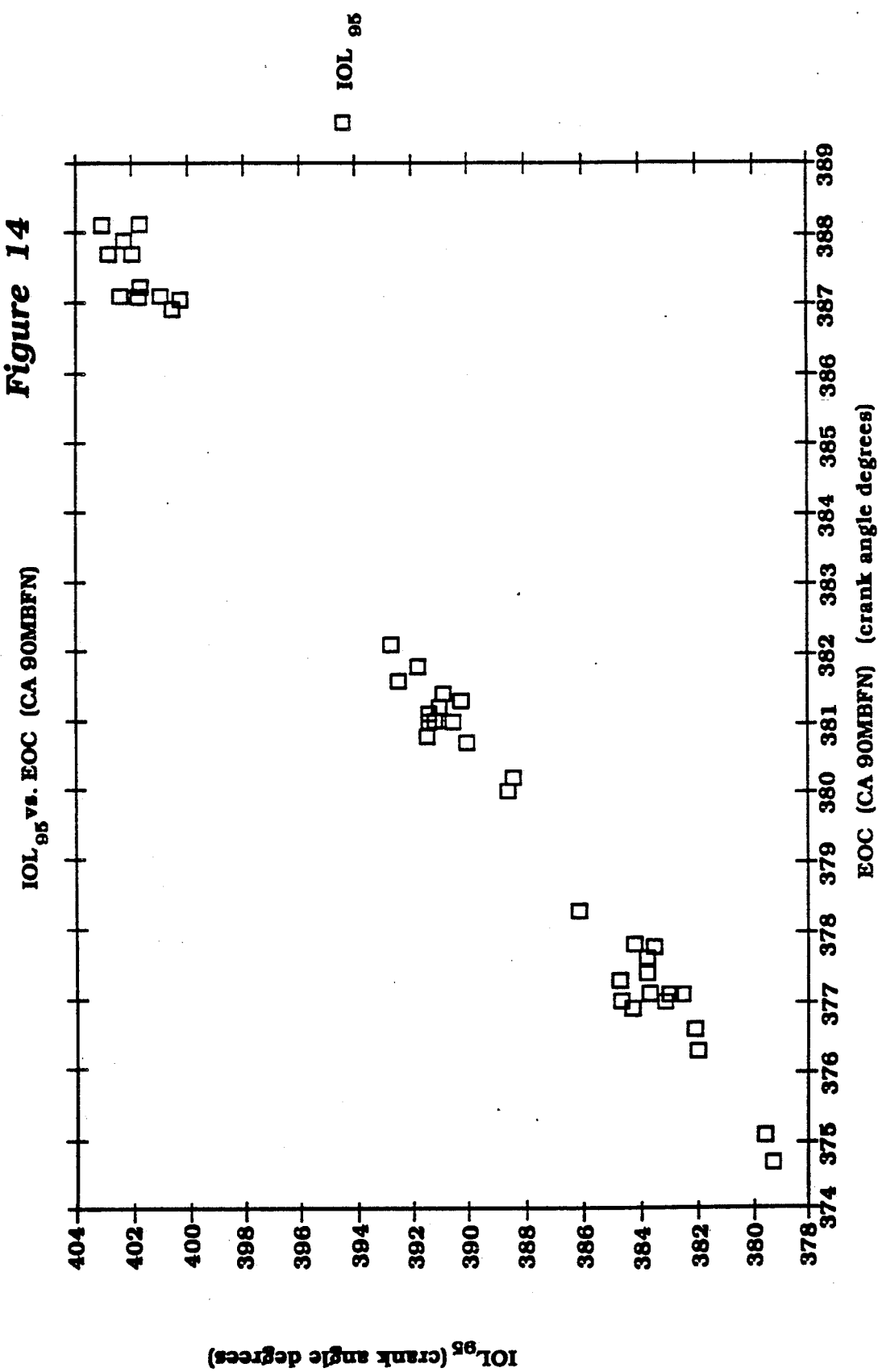
FIG. 14 shows observed end of combustion in crank angle degrees as a function of the location in crank angle degrees at which the integral of luminosity equals or is slightly greater than 95% of the total integrated luminosity.
Figure 15:
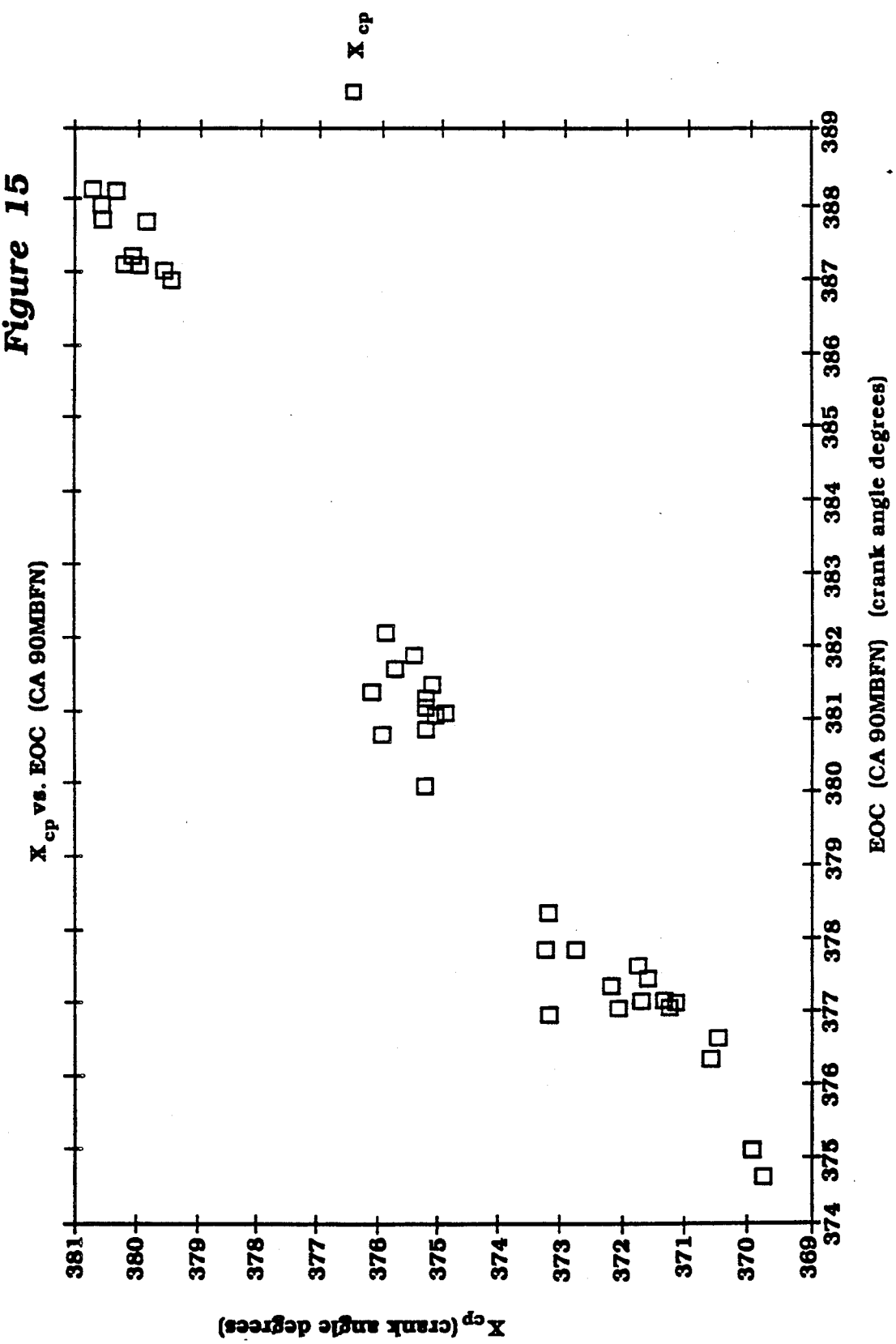
FIG. 15 shows observed end of combustion in crank angle degrees as a function of the x-coordinate of the centroid of the luminosity signal.

End of combustion (EOC) defined as the location in crank angle degrees of 90% mass burn fraction (ca90%mbfN or CA90MBFN) can be calculated and is a function of $SOL_{50}$, $EOL_0$, $IOL_{95}$ and $X_{cp}$, where $EOL_0$ is the end of luminosity or location at which the luminosity last reaches 0% of peak luminosity which can be determined by extrapolation, for example, of the angles of $EOL_5$ and $EOL_{10}$. The correlation between the observed EOC determined by a heat release model using a pressure transducer and predicted EOC based on luminosity parameters is shown in FIG. 11. The R-squared value is 0.99 with an S.D.R. of 0.29 degrees. FIG. 12 shows the relationship between $SOL_{50}$ and observed EOC both measured in crank angle degrees. FIG. 13 shows the relationship between $EOL_0$ and observed EOC both measured in crank angle degrees. FIG. 14 shows the relationship between $IOL_{95}$ and observed EOC both in crank angle degrees. FIG. 15 shows the relationship in crank angle degrees between $X_{cp}$ and observed EOC.

Having determined start and end of combustion, duration of combustion can also be readily determined by EOC−SOC.

Figure 16:
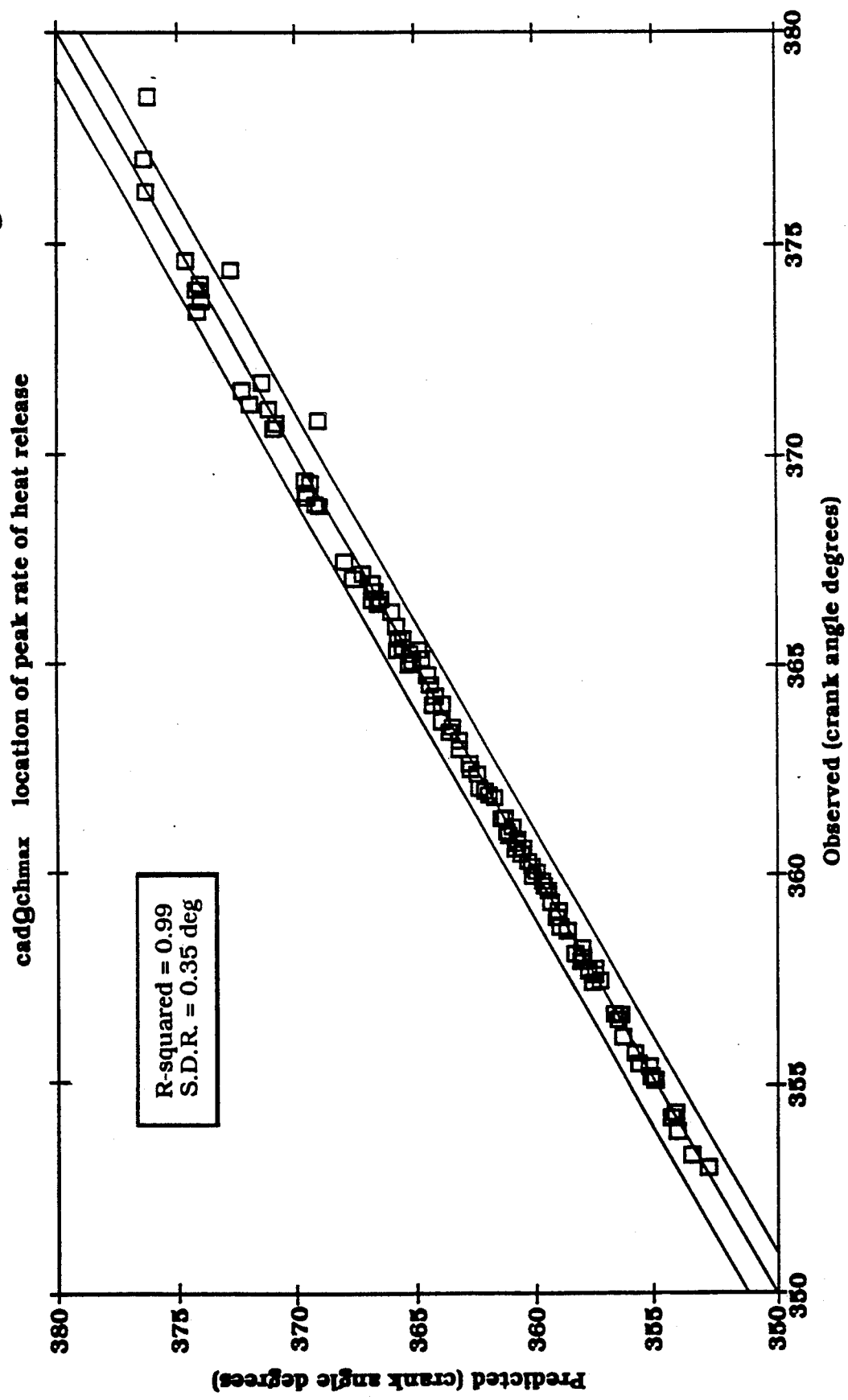
FIG. 16 shows the correlation between observed and predicted location of peak rate of heat release in the combustion chamber in crank angle degrees using start of luminosity and engine speed.
Figure 17:
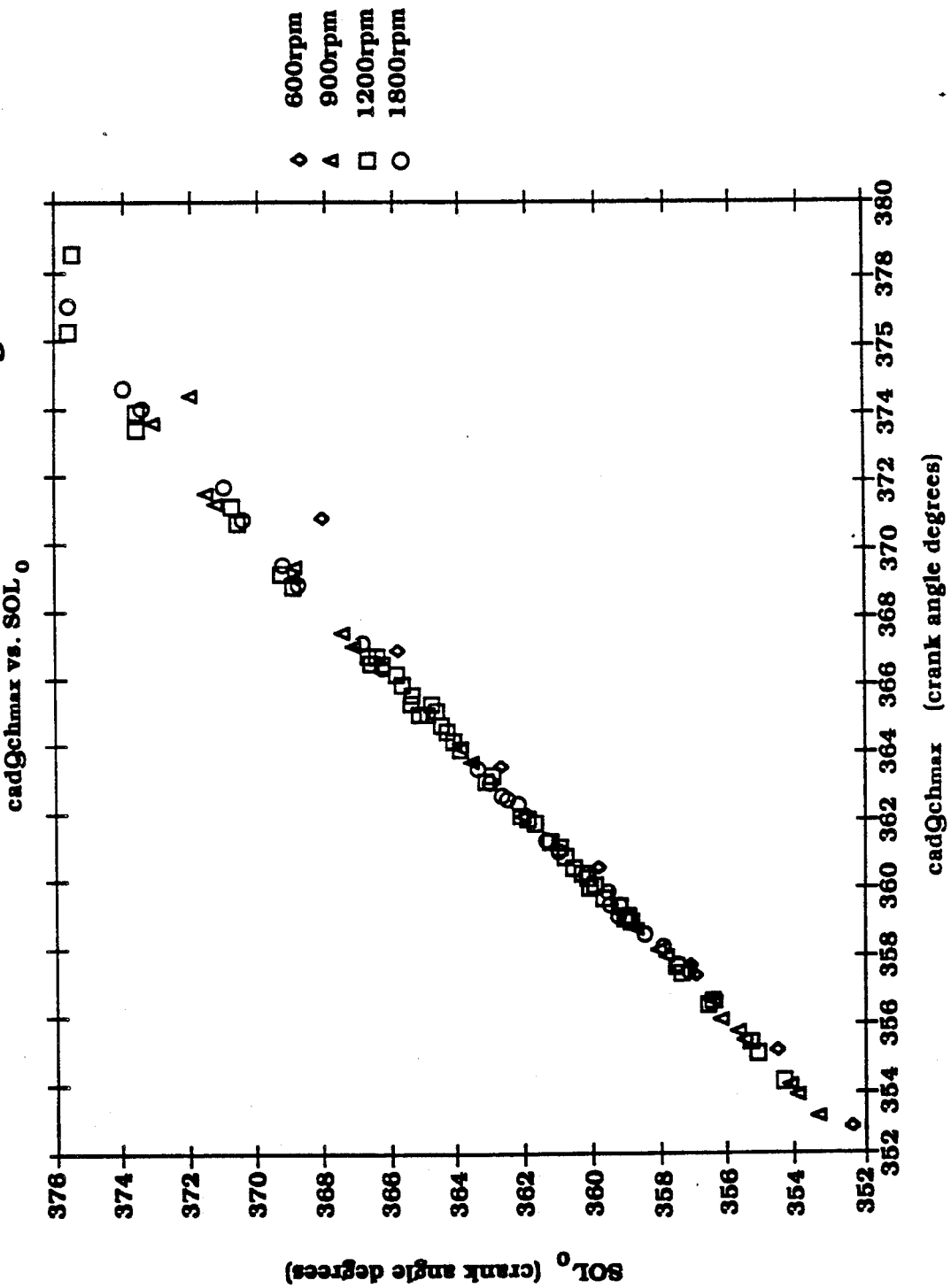
FIG. 17 shows the observed location in crank angle degrees of peak rate of heat release in the combustion chamber as a function of start of luminosity in crank angle degrees.

The start of luminosity measurement can also used to provide an estimate of the location of peak rate of heat release (cadQch$_{max}$) in the combustion chamber. This combustion condition is a function of speed and start of luminosity (SOL$_0$). The correlation between predicted location of peak rate of heat release using the regression analysis for these parameters and observed location of peak rate of heat release determined by a heat release model using a pressure transducer is shown in FIG. 16. The R-squared value is 0.99 with an S.D.R. of 0.35 degrees. FIG. 17 shows the relationship between start of luminosity and observed location of peak rate of heat release both measured in crank angle degrees under various engine speeds.

Figure 18:
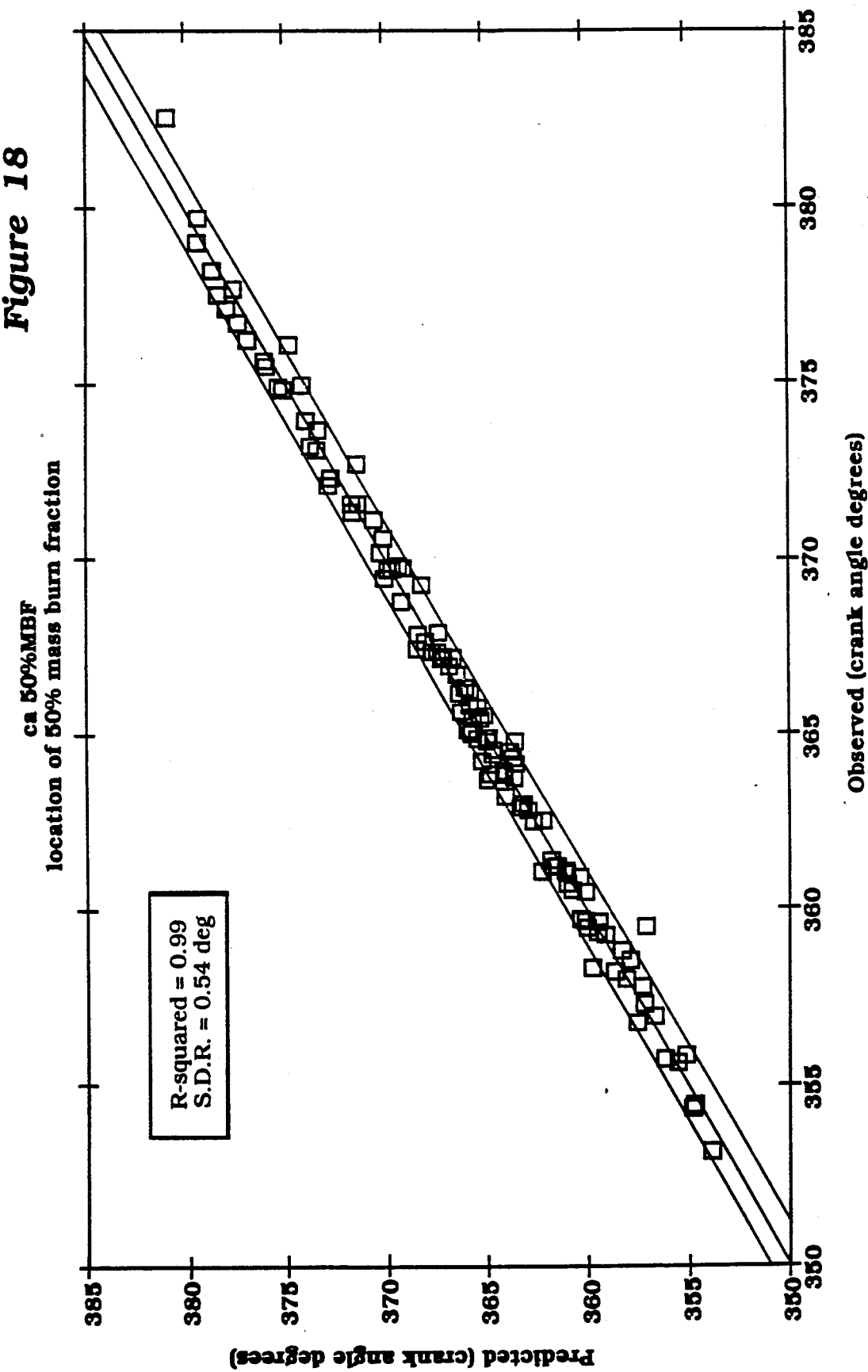
FIG. 18 shows the correlation between observed and predicted location of 50% mass burn fraction in crank angle degrees using gain independent luminosity parameters and engine speed.
Figure 19:
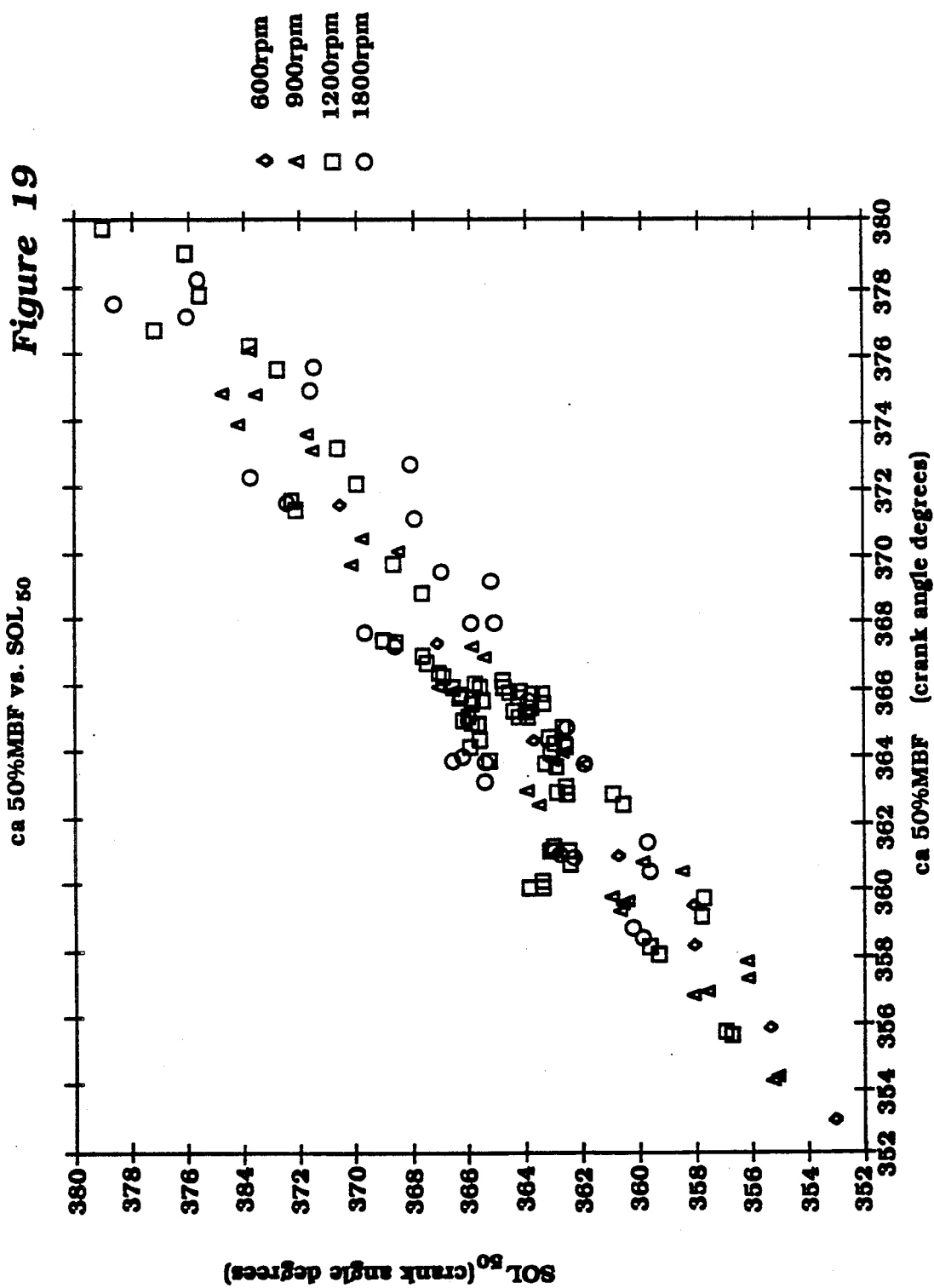
FIG. 19 shows the observed location in crank angle degrees of 50% mass burn fraction as a function of the location in crank angle degrees at which the luminosity first equals or is slightly greater than 50% of peak luminosity.
Figure 20:
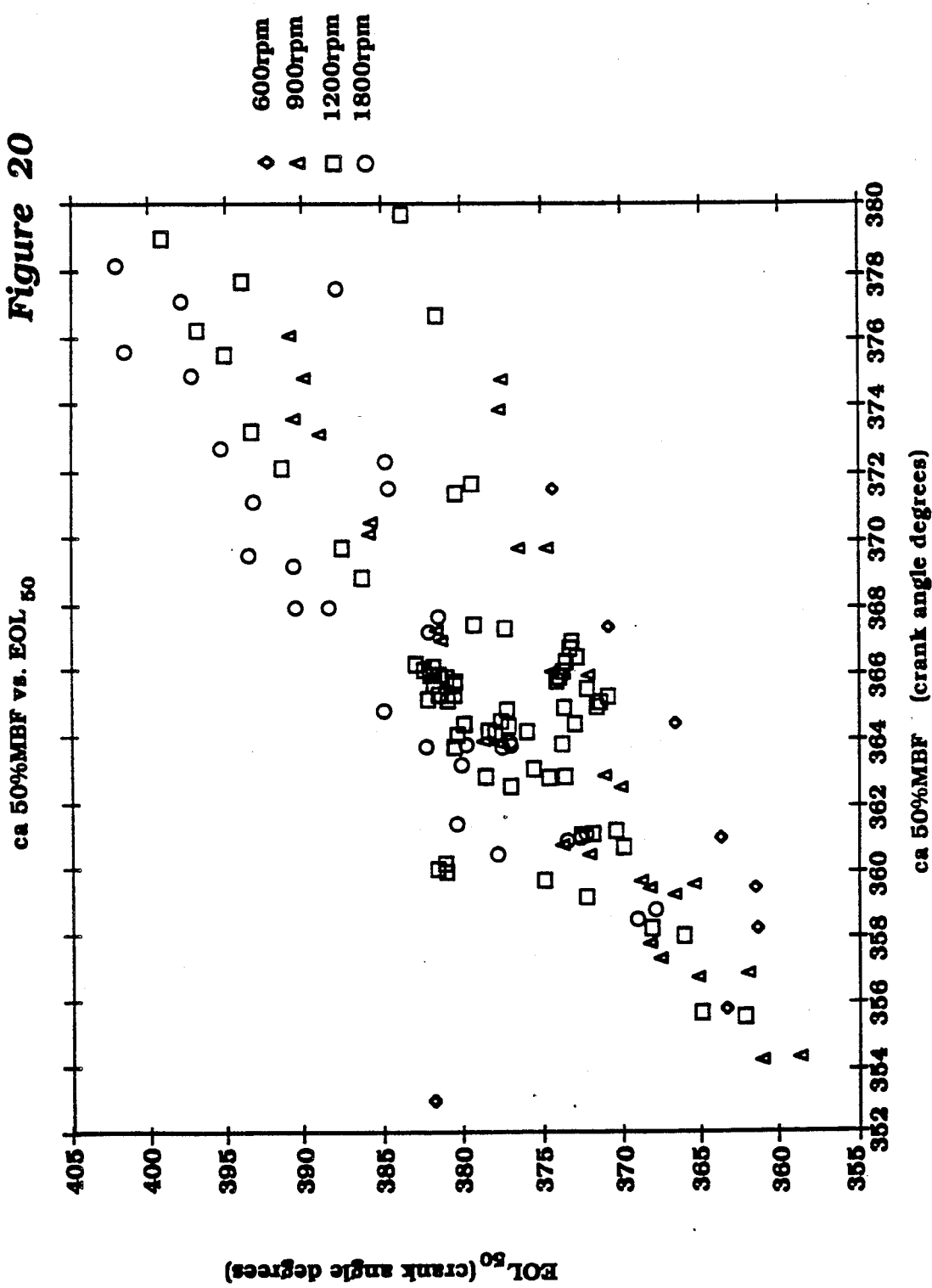
FIG. 20 shows the observed location in crank angle degrees of 50% mass burn fraction as a function of the location in crank angle degrees at which the luminosity last equals or is slightly less than 50% of peak luminosity.
Figure 21:
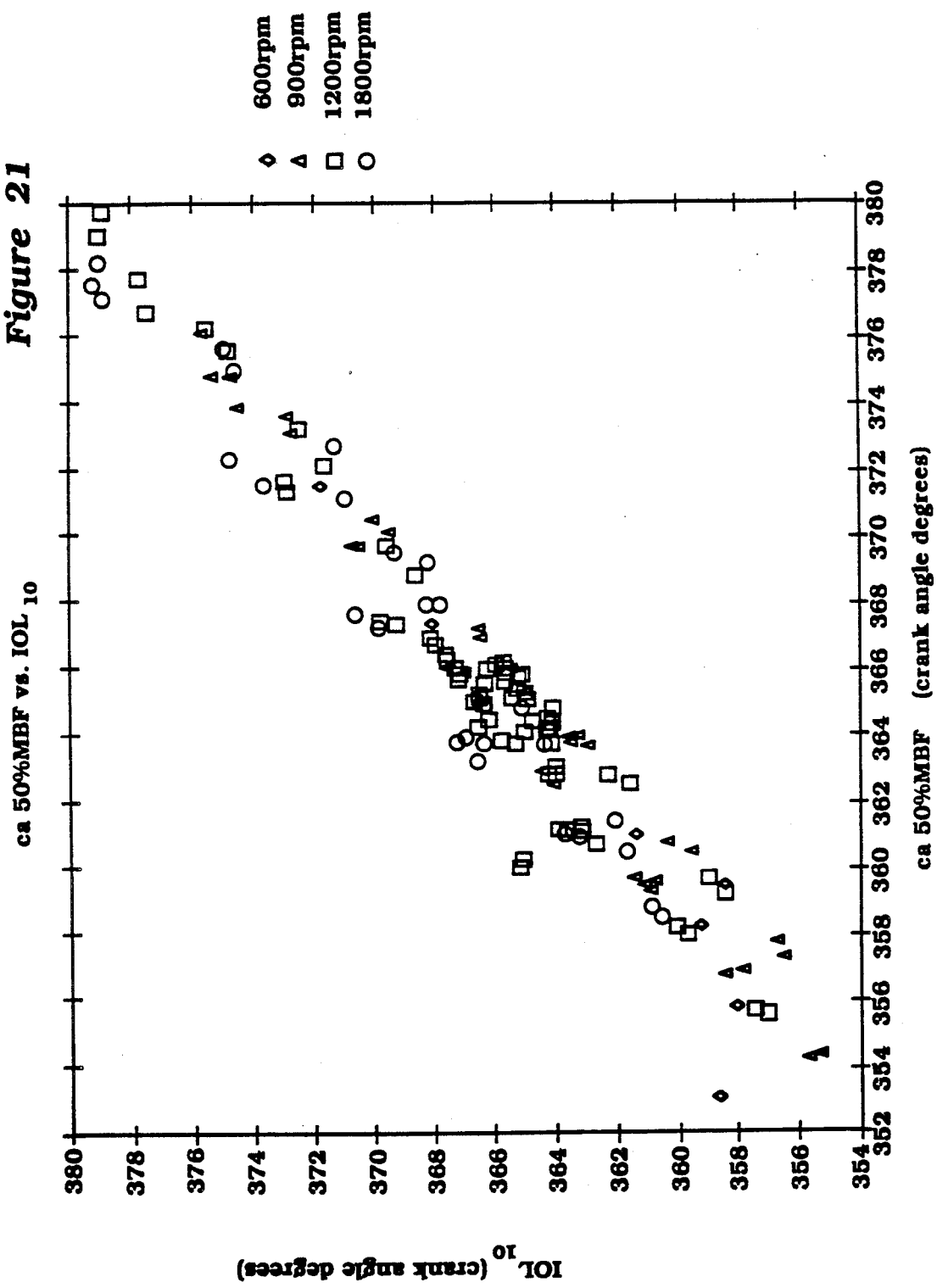
FIG. 21 shows the observed location in crank angle degrees of 50% mass burn fraction as a function of the location in crank angle degrees at which the integral of luminosity equals or is slightly greater than 10% of the total integrated luminosity.
Figure 22:
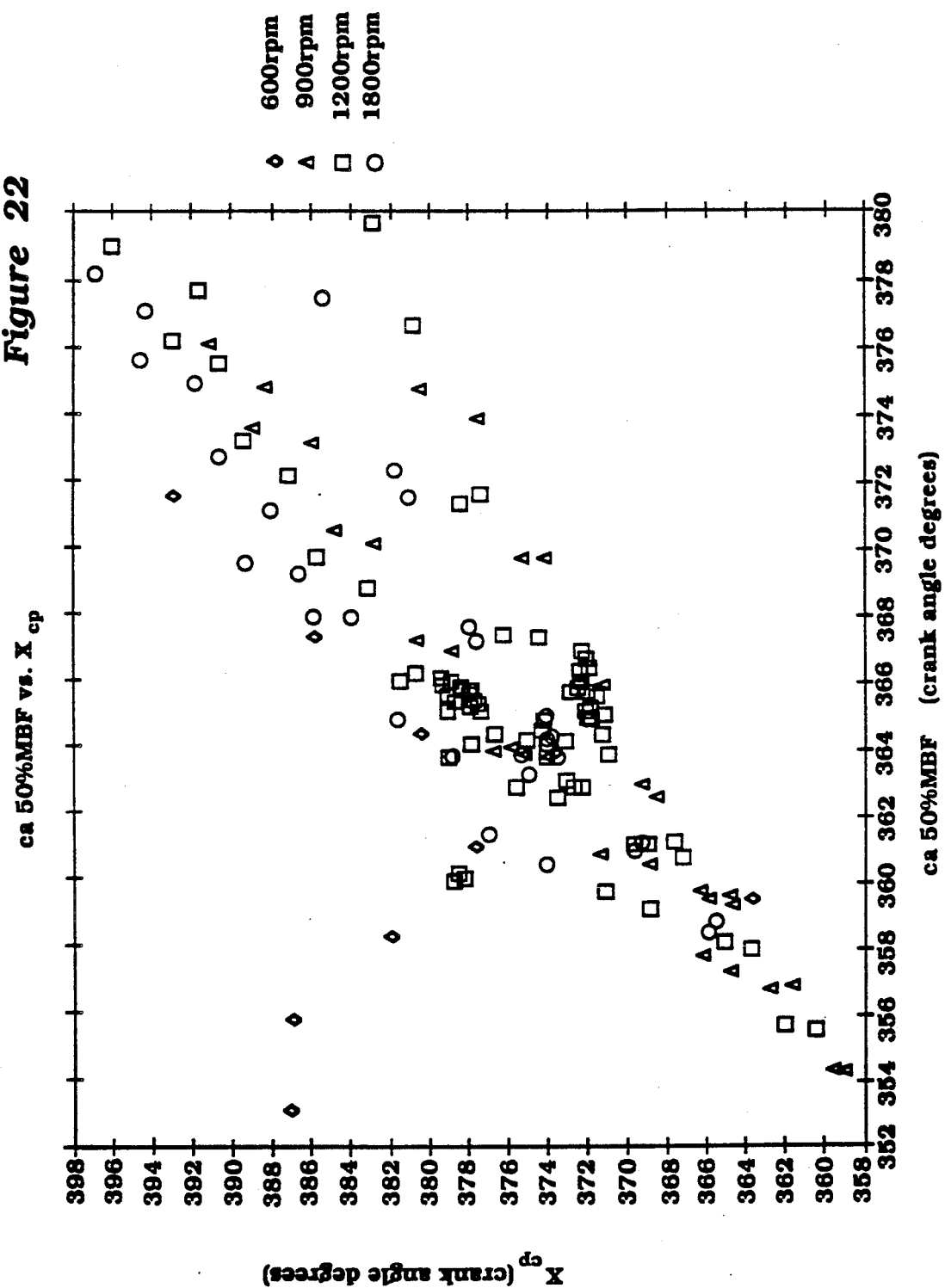
FIG. 22 shows the observed location in crank angle degrees of 50% mass burn fraction as a function of the x-coordinate of the centroid of the luminosity signal.

Various gain independent luminosity parameters in connection with engine speed can also be used to predict the location of 50% mass burn fraction in the combustion chamber. Location of 50% mass burn fraction (ca50%MFB) has been shown to be a function of speed, SOL$_{50}$, EOL$_{50}$, IOL$_{10}$, X$_{cp}$. The correlation between the observed ca50%MFB determined by a heat release model and the predicted ca50%MFB based on these luminosity parameters and engine speed is shown in FIG. 18. The correlation coefficient (R-squared) is 0.99 with a standard deviation of residuals of 0.54 degrees. FIGS. 19 through 22 show the relationship between each of these luminosity parameters individually in crank angle degrees and observed location of 50% mass burn fraction in crank angle degrees under a variety of engine speeds. FIG. 19 shows observed location of 50% mass burn fraction vs. SOL$_{50}$. FIG. 20 shows the relationship between EOL$_{50}$ and observed location of 50% mass burn fraction. FIG. 21 shows the relationship between IOL$_{10}$ and observed location of 50% mass burn fraction and FIG. 22 shows observed ca50%MFB vs. X$_{cp}$.

Figure 23:
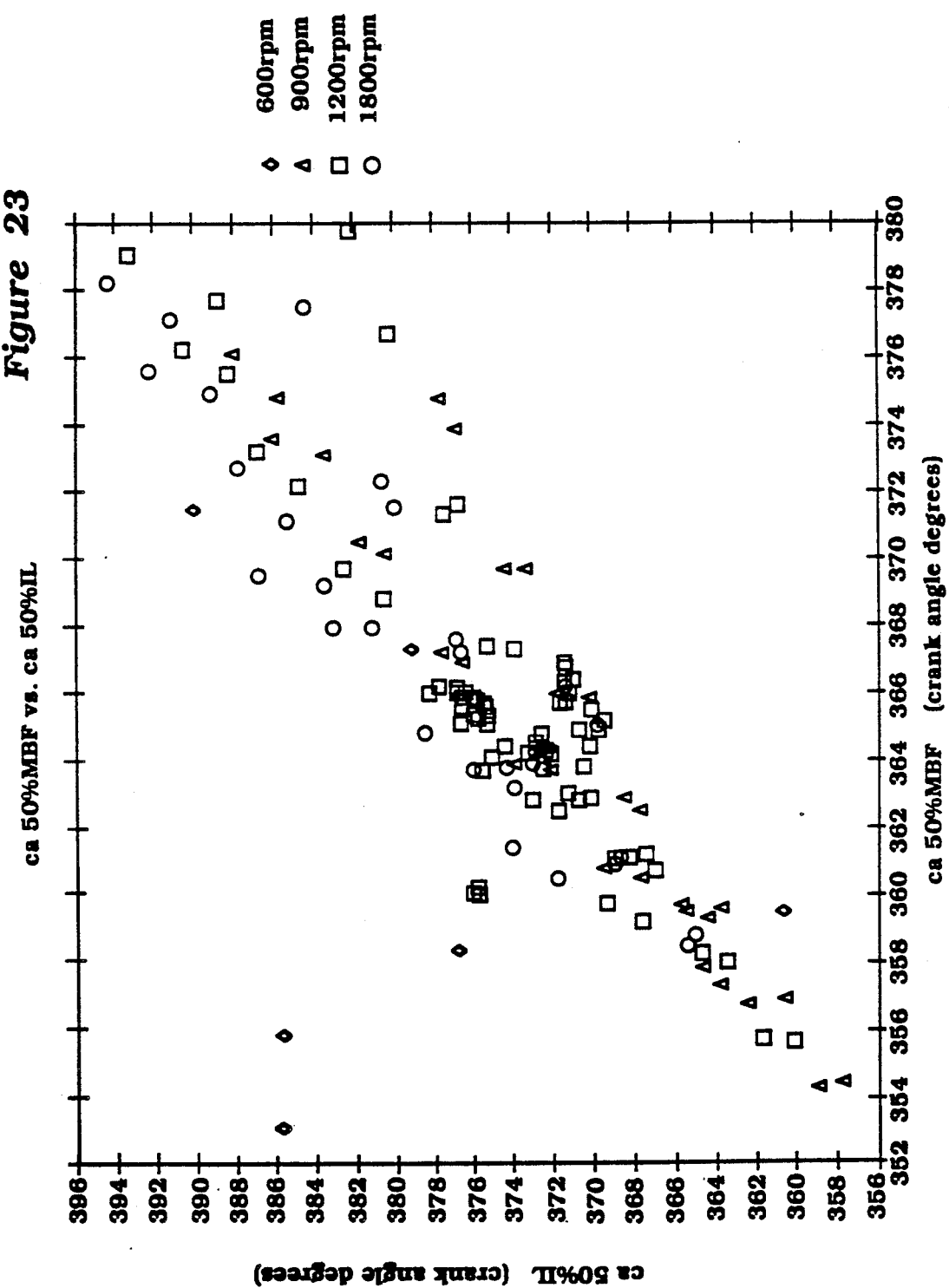
FIG. 23 shows the observed location in crank angle degrees of 50% mass burn fraction as a function of the location in crank angle degrees at which the integral of luminosity equals or is slightly greater than 50% of the total integrated luminosity.

FIG. 23 shows the relationship between the location in crank angle degrees at which the integral of luminosity is 50% of the total integrated luminosity (ca50%IL) and observed location of 50% mass burn fraction in crank angle degrees under various engine speeds. Although ca50%IL is not used in the empirical correlation of ca50%MBF, that luminosity parameter has been found to have some significance in predicting ca50%MFB. As can be seen, the relationship improves if engine speed is taken into account.

As can be seen from these figures, the relationships between the locations of the various combustion conditions and only a specific luminosity parameter are typically not as good as when the full set of parameters are used as shown in the correlations, in which case the predicted angles at which these combustion conditions occur correlate very well with the actual or observed angles. Thus, these empirical correlations can be used to provide an effective means for measuring the timing of certain combustions and for controlling combustion phasing, particularly in a diesel engine.

Figure 24:
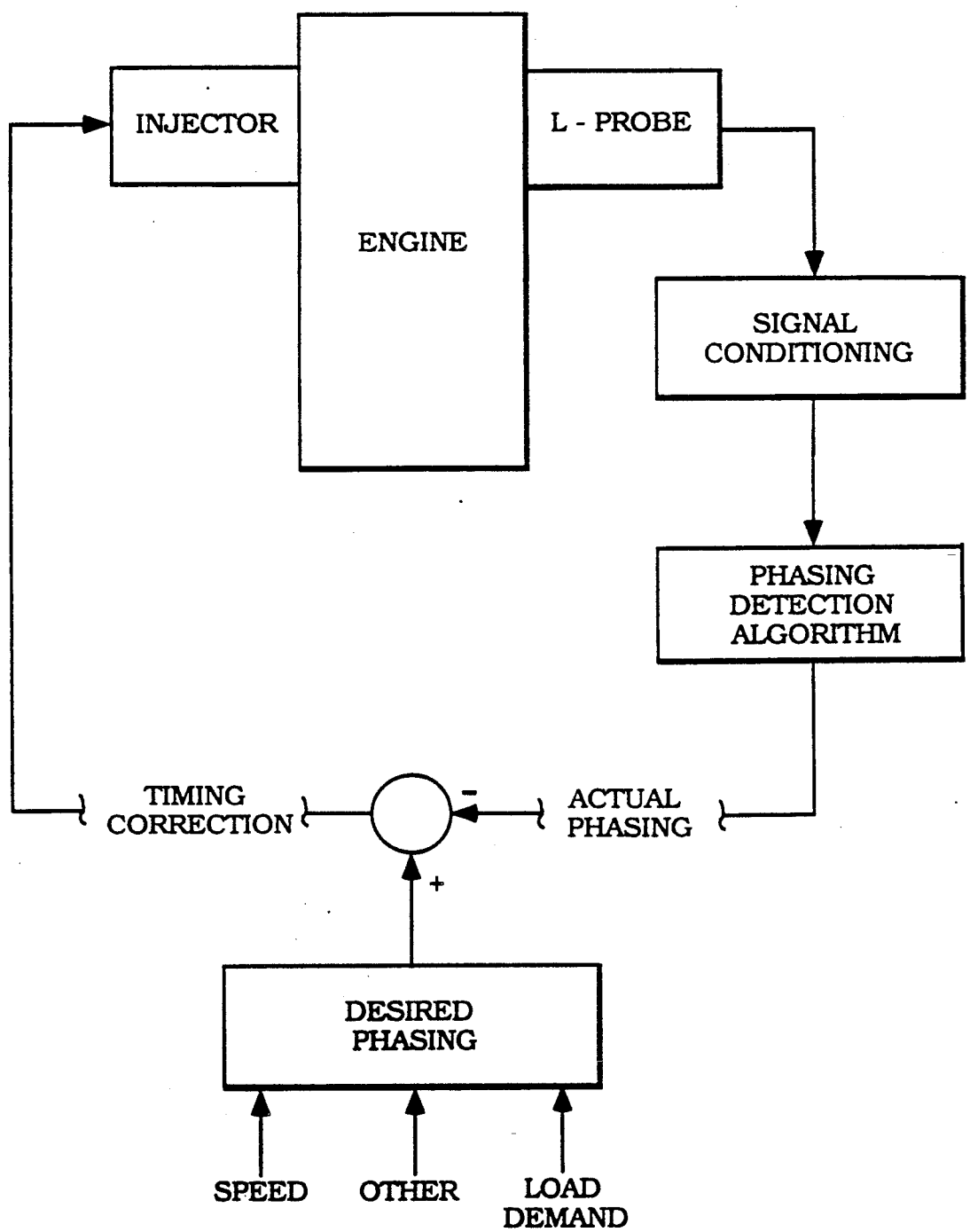
FIG. 24 is a diagramatic illustration of an engine control loop for controlling combustion phasing in accordance with the invention.

This control can be accomplished in a phasing or timing control loop as shown in FIG. 24. The luminosity detector 18 is used to generate a luminosity output signal as a function of crank angle (see FIG. 2) or other characteristic indicative of timing of the combustion process. One or more gain independent luminosity parameter of this signal can then be determined in relation to crank angle, and the location of this parameter compared with a desired location which corresponds to a desired combustion phasing to give an indication of actual phasing. The combustion phasing can then be adjusted in accordance with a preset program which may take into account engine speed, load demand or other engine operating and running condition to achieve a desired combustion phasing.

Alternatively, one or more gain independent luminosity parameter of the luminosity curve can be determined in relation to crank angle and then used to give an indication of the crank angle at which a particular combustion condition is occurring. The predicted angle at which this combustion condition is occurring can then be compared to a desired location for that combustion condition which corresponds to a desired combustion phasing. One or more of the engine's adjustable parameters can then be adjusted so that the combustion condition occurs at the desired crank angle location. This control scheme may also take into account other engine operating conditions such as engine speed, load demand, etc.

These control schemes can be based upon the measured phasing of one or more previous engine combustion cycles.

It should be readily apparent that the use of the luminosity signal and, in particular, various gain independent parameters of that curve are extremely effective in measuring various conditions in the combustion chamber and in controlling and determining combustion phasing in an internal combustion engine, particularly in a diesel engine. Although this is the case, various changes and modifications may be made without departing from the spirit and scope of the invention as defined by the appended claims.

We claim:

1. A method for operating an internal combustion engine having at least one combustion chamber, means for forming a combustible air/fuel mixture within the combustion chamber, means for detecting the luminosity within the combustion chamber, generating a curve based on the detected luminosity, determining at least the location at which the luminosity last equals or is slightly less than particular percentage of peak luminosity on the luminosity curve, and adjusting at least one parameter of the engine so that at least the location at which the luminosity last equals or is slightly less than a particularly percentage of peak luminosity is located at a desired timing point in the combustion cycle so as to control combustion phasing.

2. A method for operating an internal combustion engine as recited in claim 1, wherein the location at which the luminosity last equals or is lightly less than a particular percentage of peak luminosity is determined in relation to crank angle.

3. A method for operating an internal combustion engine as recited in claim 1, wherein the location at which the luminosity first equals a particular percentage of peak luminosity is also determined.

4. A method for operating an internal combustion engine as recited in claim 1, wherein the location at which the integral of luminosity equals a particular percentage of the total integrated luminosity is also determined.

5. A method for operating an internal combustion engine as recited in claim 1, wherein the location of the x-coordinate of the centroid of the luminosity signal is also determined.

6. A method for operating an internal combustion engine having at least one combustion chamber, means for forming a combustible air/fuel mixture within the combustion chamber, means for detecting the luminosity within the combustion chamber, generating a curve based on the detected luminosity, determining the location at which the luminosity last equals or is slightly less than a particular percentage of peak luminosity on the luminosity curve in relation to a timing point in the combustion cycle, and measuring the time in the combustion cycle at which at least one combustion condition occurs so as to control combustion phasing.

7. A method for operating an internal combustion engine as recited in claim 6, wherein the location at which the luminosity last equals or is slightly less than a particular percentage of peak luminosity on the luminosity curve is determined and the time at which at least one combustion condition occurs is measured in relation to crank angle.

8. A method for operating an internal combustion engine as recited in claim 7, wherein the location of peak pressure is measured.

9. A method for operating an internal combustion engine as recited in claim 7, wherein end of combustion is measured.

10. A method for operating an internal combustion engine as recited in claim 7, further including adjusting at least one parameter of the engine so that at least one measured combustion condition occurs at a desired crank angle so as to control combustion phasing.

11. A method for operating an internal combustion engine as recited in claim 6, wherein the location of at least one gain independent parameter of the luminosity curve is determined during each cycle of operation of the engine and the time in the combustion cycle at which at least one combustion condition occurs is measured during each cycle of operation of the engine so as to reduce cycle to cycle variations in engine operation.

12. A method for operating an internal combustion engine having at least one combustion chamber, means for forming a combustible air/fuel mixture within the combustion chamber, means for detecting the luminosity within the combustion chamber, generating a curve based on the detected luminosity, determining the location of at least one gain independent parameter of the luminosity curve in relation to a timing point in the combustion cycle, and measuring the time in the combustion cycle at which the location of 50% mass burn fraction occurs based on the determined location of at least one gain independent luminosity parameter so as to control combustion phasing.

* * * * *